(12) United States Patent
Venkatasamy et al.

(10) Patent No.: US 10,157,275 B1
(45) Date of Patent: Dec. 18, 2018

(54) TECHNIQUES FOR ACCESS MANAGEMENT BASED ON MULTI-FACTOR AUTHENTICATION INCLUDING KNOWLEDGE-BASED AUTHENTICATION

(71) Applicant: Oracle International Corporation, Redwood Shores, CA (US)

(72) Inventors: Satishkumar Venkatasamy, Bangalore (IN); Rima Rana, Ahmedabad (IN); Durga Harini Panda, Visakhapatnam (IN); Lakshmi Ramadoss, Chennai (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/782,700

(22) Filed: Oct. 12, 2017

(51) Int. Cl.
*G06F 21/40* (2013.01)
*H04L 9/32* (2006.01)
(Continued)

(52) U.S. Cl.
CPC .............. *G06F 21/40* (2013.01); *G06F 21/10* (2013.01); *H04L 9/3215* (2013.01); *H04L 63/0853* (2013.01); *H04L 2463/082* (2013.01)

(58) Field of Classification Search
CPC ........ G06F 21/32; G06F 21/33; G06F 21/335; G06F 21/35; G06F 21/36; G06F 21/43;
(Continued)

(56) References Cited

U.S. PATENT DOCUMENTS 6,041,357 A  3/2000 Kunzelman et al.
6,055,637 A  4/2000 Hudson et al.
(Continued)

FOREIGN PATENT DOCUMENTS

EP        1864240       12/2007
WO      2013049461      4/2013
(Continued)

OTHER PUBLICATIONS

BIG-IP Access Policy Manager, Available Online at http://www.f5.com/pdf/products/big-ip-access-policy-manager-ds.pdf, 2013, 13 pages.
(Continued)

*Primary Examiner* — Joseph P Hirl
*Assistant Examiner* — Sayed Aresh Beheshti Shirazi
(74) *Attorney, Agent, or Firm* — Kilpatrick Townsend LLP & Stockton LLP

(57) ABSTRACT

An access management system is disclosed that can employ multi-factor authentication (MFA) using multiple types of authentication. In at least one embodiment, techniques may include implementing multi-factor authentication (MFA) including knowledge-based authentication (KBA). MFA may be based on multiple factors, such as "what you know" (e.g., a password or an answer to a question known by a user) and "what you have" (e.g., a trusted device registered for a user). In at least one embodiment, multiple devices (e.g., a desktop computer and a mobile device) may be utilized to provide for stronger authentication using a combination of what a user has. The combination of MFA based on what you know (e.g., KBA) and what you have (e.g., a trusted device) may further ensure authentication is not compromised. The techniques disclosed herein may provide for a stronger form of authentication to reduce, if not eliminate, possible vulnerabilities for access management.

20 Claims, 17 Drawing Sheets

(51) Int. Cl.
*G06F 21/10* (2013.01)
*H04L 29/06* (2006.01)

(58) Field of Classification Search
CPC ......... G06F 2221/2117; H04L 63/0823; H04L 63/0853; H04L 63/0861; H04L 63/18
See application file for complete search history.

(56) References Cited

U.S. PATENT DOCUMENTS

| | | | |
|---|---|---|---|
| 6,076,108 A | 6/2000 | Courts et al. | |
| 6,178,511 B1 | 1/2001 | Cohen et al. | |
| 6,338,064 B1 | 1/2002 | Ault et al. | |
| 6,385,724 B1 | 5/2002 | Beckman et al. | |
| 6,430,619 B1 | 8/2002 | Sitaraman et al. | |
| 6,811,873 B2 | 11/2004 | Nadkarni | |
| 7,137,006 B1 | 11/2006 | Grandcolas et al. | |
| 7,225,256 B2 | 5/2007 | Villavicencio | |
| 7,296,290 B2 | 11/2007 | Barriga et al. | |
| 7,426,642 B2 | 9/2008 | Aupperle et al. | |
| 7,437,594 B1 | 10/2008 | Mount et al. | |
| 7,496,953 B2 | 2/2009 | Andreev et al. | |
| 7,747,746 B2 | 6/2010 | Thayer et al. | |
| 7,761,911 B2 | 7/2010 | Song | |
| 7,805,529 B2 | 9/2010 | Galluzzo et al. | |
| 7,818,582 B2 | 10/2010 | Marion et al. | |
| 7,886,000 B1 | 2/2011 | Polis et al. | |
| 7,908,380 B1 | 3/2011 | Chu et al. | |
| 7,996,376 B2 | 8/2011 | Singh et al. | |
| 8,001,232 B1 | 8/2011 | Saulpaugh et al. | |
| 8,073,954 B1 | 12/2011 | Tu et al. | |
| 8,117,649 B2 | 2/2012 | Hardt | |
| 8,244,907 B2 | 8/2012 | Hinton et al. | |
| 8,365,266 B2 | 1/2013 | Bogner | |
| 8,438,635 B2 | 5/2013 | Das et al. | |
| 8,442,943 B2 | 5/2013 | Multer et al. | |
| 8,468,586 B2 | 6/2013 | Koottayi et al. | |
| 8,495,195 B1 | 7/2013 | Abidogun et al. | |
| 8,544,069 B1 | 9/2013 | Subbiah et al. | |
| 8,611,873 B2 | 12/2013 | Onyon et al. | |
| 8,627,435 B2 | 1/2014 | Sirota | |
| 8,627,479 B2 | 1/2014 | Wittenstein et al. | |
| 8,650,305 B2 | 2/2014 | Booth et al. | |
| 8,738,774 B2 | 5/2014 | Sheng et al. | |
| 8,756,704 B2 | 6/2014 | Castellucci et al. | |
| 8,819,444 B2 | 8/2014 | Shahbazi et al. | |
| 8,843,997 B1 | 9/2014 | Hare | |
| 8,898,765 B2 | 11/2014 | Goyal et al. | |
| 8,955,037 B2 | 2/2015 | Srinivasan et al. | |
| 8,990,909 B2 * | 3/2015 | Kelley .................... | H04L 63/18 726/7 |
| 9,083,690 B2 | 7/2015 | Subramanya et al. | |
| 9,104,451 B2 | 8/2015 | Subramanya et al. | |
| 9,124,582 B2 * | 9/2015 | Kalinichenko ......... | G06F 21/43 |
| 9,230,003 B2 | 1/2016 | Goetsch | |
| 9,247,006 B2 | 1/2016 | Mathew et al. | |
| 9,405,887 B2 | 8/2016 | Yin et al. | |
| 9,544,293 B2 | 1/2017 | Mathew et al. | |
| 9,769,147 B2 | 9/2017 | Mathew et al. | |
| 9,866,640 B2 | 1/2018 | Motukuru et al. | |
| 9,887,981 B2 | 2/2018 | Mathew et al. | |
| 10,009,335 B2 | 6/2018 | Mathew et al. | |
| 2002/0029269 A1 | 3/2002 | McCarty et al. | |
| 2002/0078365 A1 | 6/2002 | Burnett et al. | |
| 2004/0003259 A1 | 1/2004 | Chang | |
| 2005/0091655 A1 | 4/2005 | Probert et al. | |
| 2005/0108570 A1 | 5/2005 | Gopalraj | |
| 2005/0120091 A1 | 6/2005 | Casais et al. | |
| 2005/0144482 A1 | 6/2005 | Anuszewski | |
| 2006/0059546 A1 | 3/2006 | Nester et al. | |
| 2006/0218630 A1 | 9/2006 | Pearson et al. | |
| 2006/0236382 A1 | 10/2006 | Hinton et al. | |
| 2006/0277596 A1 | 12/2006 | Calvert et al. | |
| 2007/0147247 A1 | 6/2007 | Kalonji et al. | |
| 2007/0192326 A1 | 8/2007 | Angal et al. | |
| 2008/0113791 A1 * | 5/2008 | Williams ................ | G06F 21/36 463/29 |
| 2008/0114883 A1 | 5/2008 | Singh et al. | |
| 2008/0294781 A1 | 11/2008 | Hinton et al. | |
| 2009/0037763 A1 | 2/2009 | Adhya et al. | |
| 2009/0047928 A1 * | 2/2009 | Utsch ..................... | G06F 21/40 455/410 |
| 2010/0043062 A1 * | 2/2010 | Alexander ............. | G06F 21/36 726/6 |
| 2010/0131755 A1 | 5/2010 | Zhu et al. | |
| 2010/0146611 A1 | 6/2010 | Kuzin et al. | |
| 2011/0185421 A1 | 7/2011 | Wittenstein et al. | |
| 2012/0078708 A1 | 3/2012 | Taylor et al. | |
| 2012/0106333 A1 | 5/2012 | Lee et al. | |
| 2012/0191842 A1 | 7/2012 | Hu et al. | |
| 2012/0254949 A1 | 10/2012 | Mikkonen et al. | |
| 2012/0254957 A1 | 10/2012 | Fork et al. | |
| 2012/0266229 A1 | 10/2012 | Simone et al. | |
| 2012/0291090 A1 | 11/2012 | Srinivasan et al. | |
| 2013/0036454 A1 | 2/2013 | Purvis et al. | |
| 2013/0073670 A1 | 3/2013 | Das et al. | |
| 2013/0198818 A1 | 8/2013 | Hitchcock et al. | |
| 2014/0068702 A1 | 3/2014 | Hyndman et al. | |
| 2014/0149280 A1 | 5/2014 | Karkhanis et al. | |
| 2014/0282961 A1 * | 9/2014 | Dorfman ............. | H04L 63/0823 726/7 |
| 2014/0304773 A1 * | 10/2014 | Woods ................... | H04L 63/08 726/3 |
| 2014/0344326 A1 | 11/2014 | Kamath et al. | |
| 2015/0082029 A1 | 3/2015 | Volchok | |
| 2015/0088978 A1 | 3/2015 | Motukuru et al. | |
| 2015/0089569 A1 | 3/2015 | Sondhi et al. | |
| 2015/0089570 A1 | 3/2015 | Sondhi et al. | |
| 2015/0089571 A1 | 3/2015 | Srinivasan et al. | |
| 2015/0089579 A1 | 3/2015 | Manza et al. | |
| 2015/0089580 A1 | 3/2015 | Manza et al. | |
| 2015/0089596 A1 | 3/2015 | Sondhi et al. | |
| 2015/0089597 A1 | 3/2015 | Srinivasan et al. | |
| 2015/0089604 A1 | 3/2015 | Mathew et al. | |
| 2015/0089614 A1 | 3/2015 | Mathew et al. | |
| 2015/0089617 A1 | 3/2015 | Sondhi et al. | |
| 2015/0089619 A1 | 3/2015 | Manza et al. | |
| 2015/0089620 A1 | 3/2015 | Manza et al. | |
| 2015/0089622 A1 | 3/2015 | Sondhi et al. | |
| 2015/0089623 A1 | 3/2015 | Sondhi et al. | |
| 2015/0150099 A1 * | 5/2015 | Eguchi ................. | G06F 21/31 726/5 |
| 2015/0220713 A1 * | 8/2015 | Beenau ................ | G06Q 20/32 726/19 |
| 2015/0220926 A1 * | 8/2015 | McLachlan ............ | H04L 63/08 705/44 |
| 2016/0065570 A1 * | 3/2016 | Spencer, III ........... | G06Q 20/40 726/7 |
| 2016/0219040 A1 | 7/2016 | Mathew et al. | |
| 2016/0232516 A1 * | 8/2016 | Dayan ................. | G06Q 20/3227 |
| 2016/0248758 A1 | 8/2016 | Mathew et al. | |
| 2016/0380941 A1 * | 12/2016 | Tanurdjaja ............. | H04L 51/16 709/205 |
| 2016/0381000 A1 | 12/2016 | Mathew et al. | |
| 2017/0034152 A1 | 2/2017 | Subramanya et al. | |
| 2017/0085556 A1 | 3/2017 | Mathew et al. | |
| 2017/0118218 A1 | 4/2017 | Koottayi et al. | |
| 2017/0118222 A1 | 4/2017 | Subramanya et al. | |
| 2017/0118249 A1 | 4/2017 | Motukuru et al. | |
| 2017/0201524 A1 * | 7/2017 | Dureau ................ | H04L 63/101 |
| 2018/0046794 A1 | 2/2018 | Mathew et al. | |
| 2018/0077243 A1 | 3/2018 | Mathew et al. | |

FOREIGN PATENT DOCUMENTS

| | | |
|---|---|---|
| WO | 2015042546 | 3/2015 |
| WO | 2015042547 | 3/2015 |
| WO | 2016051240 A1 | 4/2016 |

(56) References Cited

OTHER PUBLICATIONS

Configuring VMware Identity Manager for Multiple Data Centers, Technical White Paper: VMware Identity Manager 2.8, Available Online at https://www.vmware.com/content/dam/digitalmarketing/vmware/en/pdf/techpaper/vmware-identity-manager-multiple-data-center-configuration. pdf, Dec. 2016, 16 pages.

Developing an Application to Manage Impersonation, Fusion Middleware, Developer's Guide for Oracle Access Management, Nov. 2012, 10 pages.

IBM Security Access Manager for Enterprise Single Sign-On, Available online at: http://www-03.ibm.com/software/products/en/access-mgr-esso, Nov. 10, 2016, 2 pages.

IBM Security Access Manager for Enterprise Single Sign-On, Available Online at http://onwireco.com/wp-content/uploads/2013/12/IBM_Security_Access_Manager_For_Enterprise_Single_Sign-On.pdf, 2013, 8 pages.

Impersonate Another User: Dynamics CRM 2015, Available Online at https://msdn.microsoft.com/en-us/library/gg334744(v=crm.7).aspx, 2015, 1 page.

Implementing Single Sign-On Across Multiple Organizations, Developer.force.com, Available Online at https://developersalesforce.com/page/Lmplementing_Single_Sign-On_Across_Multiple_Organizations, Dec. 19, 2013, 8 pages.

Installing vCenter Single Sign-On in a Multisite Deployment (2034074), Available Online at http://kb.vmware.com/selfservice/microsites/search.do language=en_US&cmd=displayKC&externalId=2034074, 2014, 2 pages.

Multi-Data Center With Session Sharing, IBM Security Access Manager for Web, Version 7.0, Available Online at https://www.ibm.com/support/knowledgecenter/SSPREK_7.0.0/com.ibm.isam.doc_70/ameb_smsdeploy_guide/concept/c_multi_data_center_with_session.html, 2017, 3 pages.

Multiple Data Centers, Available Online at https://support.ca.com/cadocs/0/CA%20SiteMinder%2012%2052%20SP1-ENU/Bookshelf_Files/HTML/idocs/index.htm?toc.htm?706393.html?intcmp=searchresultclick&resultnum=452, 2014, 8 pages.

Oracle Enterprise Single Sign-On Suite Plus 11gR2 PS2, Available Online at http://www.oracle.com/technetwork/middleware/id-mgmt/esso-suite-technical-whitepaper-1519077.pdf, Jan. 2014, 25 pages.

Oracle Fusion Middleware Developer's Guide for Oracle Access Management, Developing an Application to Manage Impersonation, Available Online at https://docs.oracle.com/cd/E5273401/oam/AIDE/impersonation.htm#AIDEV422, 2015, 11 pages.

Oracle Fusion Middleware Developing Web Applications, Using Sessions and Session Persistence, Available Online at http://docs.oracle.com/cd/E12839_01/web.1111/e13712/sessions.htm#WBAPP301, May 2009, 6 pages.

Oracle Fusion Middleware Performance and Tuning for Oracle WebLogic Server, Available Online at http://docs.oracle.com/cd/E12839_01/web.1111/e13814/webapptune.htm#PERFM368, 2015, 3 pages.

Symantec Identity: Access Manager, Available Online at http://www.symantec.com/content/en/us/enterprise/fact_sheets/b-symantec_identity_access_manager_DS_21227840, 2014, 2 pages.

The ABCs of ADCs, White Paper: ABCs of Application Delivery, Available Online at https://www.fortinet.com/content/dam/fortinet/assets/white-papers/FortiADC-ABCs.pdf, 2014, 8 pages.

The Art of Logging Out, Available online at: https://www.kth.se/social/group/cas/page/the-art-of-logging-out, Apr. 26, 2013, 2 pages.

Understanding Jive Mobile's SSO Compliance, Jive Software, Available online at https://community.jivesoftware.com/docs/DOC-61829, Jun. 25, 2012, 11 pages.

User Session Monitoring for CA Single Sign-On, Available online at https://www.ca.com/content/dam/ca/us/files/service-offering/user-session-monitor-for-ca-single-sign-on.pdf, 2015, 1 page.

U.S. Appl. No. 14/135,053, Final Office Action dated Jul. 6, 2015, 17 pages.

U.S. Appl. No. 14/135,053, Non-Final Office Action dated Jan. 29, 2015, 16 pages.

U.S. Appl. No. 14/135,053, Non-Final Office Action dated Nov. 25, 2015, 18 pages.

U.S. Appl. No. 14/135,053, Notice of Allowance dated May 20, 2016, 10 pages.

U.S. Appl. No. 14/135,053, Notice of Allowance dated Aug. 31, 2016, 9 pages.

U.S. Appl. No. 14/137,775, Non-Final Office Action dated May 22, 2015, 10 pages.

U.S. Appl. No. 14/137,775, Notice of Allowance dated Sep. 16, 2015, 9 pages.

U.S. Appl. No. 14/491,076, Final Office Action dated Oct. 25, 2016, 19 pages.

U.S. Appl. No. 14/491,076, Final Office Action dated Oct. 6, 2016, 19 pages.

U.S. Appl. No. 14/491,076, Non-Final Office Action dated Mar. 11, 2016, 13 pages.

U.S. Appl. No. 14/491,076, Notice of Allowance dated Nov. 2, 2017, 11 pages.

U.S. Appl. No. 14/754,222, Non-Final Office Action dated Dec. 1, 2016, 10 pages.

U.S. Appl. No. 14/754,222, Notice of Allowance dated May 17, 2017, 5 pages.

U.S. Appl. No. 14/814,209, Final Office Action dated Jul. 31, 2017, 19 pages.

U.S. Appl. No. 14/814,209, Non-Final Office Action dated Jan. 11, 2017, 13 pages.

U.S. Appl. No. 15/005,365, Final Office Action dated Mar. 10, 2017, 12 pages.

U.S. Appl. No. 15/005,365, Non-Final Office Action dated Aug. 24, 2016, 11 pages.

U.S. Appl. No. 15/005,365, Notice of Allowance dated Sep. 27, 2017, 16 pages.

U.S. Appl. No. 15/143,240, Notice of Allowance dated May 24, 2018, 15 pages.

U.S. Appl. No. 15/143,240, Final Office Action dated Dec. 15, 2017, 14 pages.

U.S. Appl. No. 15/143,240, Non-Final Office Action dated Jun. 5, 2017, 11 pages.

U.S. Appl. No. 15/372,342, Non-Final Office Action dated Oct. 20, 2017, 14 pages.

U.S. Appl. No. 15/372,342, Notice of Allowance dated Mar. 13, 2018, 12 pages.

U.S. Appl. No. 61/880,335, filed Sep. 20, 2013.

U.S. Appl. No. 61/880,400, filed Sep. 20, 2013.

U.S. Appl. No. 61/880,569, filed Sep. 20, 2013.

U.S. Appl. No. 61/880,598, filed Sep. 20, 2013.

Dacosta et al., One-Time Cookies: Preventing Session Hijacking Attacks with Stateless Authentication Tokens, ACM Transactions on Internet Technology, vol. 12, Issue 1, Jun. 2012, 31 pages.

Ferguson et al., Session Management Server: Session Transitions and State, Available Online at http://www.ibm.com/developerworks/tivoli/library/t-sms-states/, Jun. 25, 2007, 7 pages.

Gaur, IBM Extreme Transaction Processing (XTP) Patterns: Scalable and Robust HTTP Session Management with WebSphere eXtreme Scale, Available Online at http://www.ibm.com/developerworks/websphere/library/techarticles/0905_gaur/0905_gaur.html, May 27, 2009, 8 pages.

Haire, A Solution to SSO Authentication and Identity Management: Lessons Learned, Atlassian Blog, May 16, 2013, 5 pages.

Mortimore et al., Implementing Single Sign-On Across Multiple Organizations, Available Online at https://developer.salesforce.com/page/Implementing_Single_Sign-On_Across_Multiple_Organizations, Oct. 2014, 15 pages.

Murdoch, Hardened Stateless Session Cookies, in International Workshop on Security Protocols, Springer Berlin Heidelberg, Apr. 2008, 9 pages.

Pujolle et al., Secure Session Management With Cookies, 7th International Conference on Information, Communications and Signal Processing (ICICS), 2009, 6 pages.

Rivard, Clearing Novell Access Manager Application Sessions, Available Online at https://www.netiq.com/communities/cool-solutions/clearing-novell-access-manager-application-sessions/, Jan. 26, 2009, 4 pages.

(56) References Cited

OTHER PUBLICATIONS

Samar, Single Sign-On Using Cookies for Web Applications, Enabling Technologies: Infrastructure for Collaborative Enterprises, (WET ICE '99) Proceedings. IEEE 8th International Workshops on, Stanford, CA, 1999, pp. 158-163.

Stirpe et al., Time-out Management in Multi-domain Single Sign-On, Available Online at http://www.strattagroup.com/tsg/pubs/ssotime-out.pdf, 2005, 13 pages.

Volodarsky et al., Fast, Scalable, and Secure Session State Management for Your Web Applications, Available Online at https://msdn.microsoft.com/enus/magazine/cc163730.aspx, 2015, 9 pages.

Ye, A complete Impersonation Demo, Available Online at http://www.codeproject.com/Articles/125810/A-complete-Impersonation-Demo-in-Csharp-NET, Jun. 20, 2013, 12 pages.

"Adaptive Authentication" RSA Security product literature, downloaded from https://www.rsa.com/en-us/products-services/fraud-prevention/adaptive-authentication, Copyright 2016, 4 pages.

Nagalakshmi et al. "Confident Multi-Factor Authentication on web application via Captcha Technologies," International Journal of Computer Engineering in Research Trends, 2:8 Aug. 2015, pp 516-522.

"Dual factor authentication" Reliance Securities product literature, downloaded from http://www.rsec.co.in/images/nlimages/pdf/DUAL-FACTOR-AUTHENTICATION-PROCESS.pdf, no date, downloaded Sep. 2016, 8 pages.

\* cited by examiner

TECHNIQUES FOR ACCESS MANAGEMENT BASED ON MULTI-FACTOR AUTHENTICATION INCLUDING KNOWLEDGE-BASED AUTHENTICATION

BACKGROUND

Generally, the present application relates to data processing. More specifically, the application is related to techniques for multi-factor authentication.

Modern businesses rely on a variety of applications and systems that control and generate information that is critical to business operations. Different applications often provide different services and information, and different users may require access to different levels of information within each system or application. The level of access that users are granted may depend on the role of the user. For example, a manager may need access to certain information about employees that report to him, but it may be improper for that manager to access the same information about those whom he reports to.

Earlier, less sophisticated applications incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Engineers quickly realized that having an access management system for each application in an enterprise was much like having a gas station for each car, and determined that authentication and access control would be more efficiently implemented and managed as a shared resource. These shared resources became known as an access management systems.

Access management systems often use policies and other business logic to make a determination regarding whether a particular access request should be granted to a particular resource. Upon making a determination that access should be granted, a token is provided to the requestor. This token is like a key that can be used to open a door that guards restricted data. For example, a user may attempt to access a human resources database to gather information about certain employees such as salary information. The user's web browser makes a request to the application, which requires authentication. If the web browser does not have a token, the user is asked to log in to the access management system. When the user is authenticated, the user's browser receives a cookie that represents a token that may be used to access the human resources application.

In enterprise and cloud environments, users (e.g., employees) typically may have access to one or more different systems and applications. Each of these systems and applications may utilize different access control policies and require different credentials (e.g., user names and passwords). Single sign-on (SSO) can provide a user with access to multiple systems and applications after an initial login. For example, when the user logs-in to their work computer, the user can then also have access to one or more other resources, such as systems and applications. An access management system may challenge a user to verify his/her identity to determine access to a resource. The user may be challenged for information based on a combination of "what you have," "what you know," and "who you are."

Access management systems can prompt a user with a graphical user interface on a client device to challenge the user for information to verify the user's credentials. Sometimes, information requested of a user may include sensitive, confidential information, which if comprised, may threaten the identity and personal information (e.g., financial information or account information) of the individual. As a result, users may be hesitant to provide sensitive information to a system, such as a server, to gain access to resources, without being sure that the system requesting the information does actually control access to those resources.

With on-going technology-based advances in identity theft using techniques such as spoofing and phishing, users are even more reluctant to provide their credentials without being sure that the recipient is an access management system. Access management systems are also unsure as to the authenticity of the source of credentials. In some instances, a client system may receive a one-time code (e.g., password) to enable the user operating the client system to access a resource via the access management system. The client system, if compromised or stolen, may enable a user operating the client system to obtain unauthorized access to a resource using the one-time code. Though passwords have been an accepted norm for authenticating users and providing access, they are fraught with problems—people forget their passwords or make it easy enough to be guessed. Using layered security and multiple factors of authentication is gaining ground as a more secure method authentication to prevent fraud.

With a shift towards cloud-based environments, access management encounters further challenges that introduce difficulty in providing trust for identity management. Techniques such as multi-factor authentication (MFA) and knowledge-based authentication (KBA) may be employed to ensure greater security for access management. The growth of social networking has introduced vulnerabilities into MFA and KBA. MFA may rely on a trusted device to provide stronger authentication, but may not prevent access when the device is lost or stolen. KBA may rely on user's private information such that KBA may be compromised. Personal information may be accessible through social networking such that secure forms of authentication such as MFA and KBA may be compromised. Some access management systems may employ different techniques for access management; however, such access management systems may be susceptible to security vulnerabilities through one or more of credential guessing, phishing, eavesdropping, replaying, and man-in-the-middle (MITM) attacks.

BRIEF SUMMARY

The present disclosure relates generally to techniques for an identity management (IDM) system employing multi-factor authentication (MFA) using multiple types of authentication. In at least one embodiment, techniques may include implementing multi-factor authentication (MFA) including knowledge-based authentication (KBA). MFA may be based upon multiple factors, such as "what you know" (e.g., a password or an answer to a question known by a user) and "what you have" (e.g., a trusted device registered for a user). In at least one embodiment, multiple devices (e.g., a desktop computer and a mobile device) may be utilized to provide for stronger authentication using a combination of what a user has. The combination of MFA based on what you know (e.g., KBA) and what you have (e.g., a trusted device) may further ensure authentication is not compromised. The techniques disclosed herein may provide for a stronger form of authentication to reduce, if not eliminate, possible vulnerabilities for access management.

A system is disclosed for implementing MFA using multiple types of authentication. The authentication may enable a user to access one or more resources. In at least one embodiment, the system includes a computer system implemented in or with an identity management (IDM) system. The system may be implemented in different computing environments including an enterprise computing environment and a cloud computing environment. The system may be implemented to configure MFA to authenticate a user, such that the MFA may include KBA as a step of the MFA. Traditional MFA can be compromised in many different ways as discussed above. KBA may be compromised through different scenarios, some of which may involve use of social networks. According to this disclosure, MFA may be implemented with KBA through use of multiple clients. One client (e.g., a first client) may be operated by a user for registration of the user for KBA as part of a MFA process.

A user may initiate registration for KBA by providing credential (e.g., a user name and password) information at a first client to determine initial authentication of the user with an IDM system before registering for KBA. Based on successful authentication of the user, a client may present one or more graphical interfaces that are interactive to enable the user to provide input to configure one or more media content (e.g., an image, a video, or an audio file) for KBA authentication. The client may be the first client or another client (e.g., a second client), such as a mobile device, which may be more trusted for stronger authentication. The graphical interface(s) may be interactive to receive the media content and information about the media content (e.g., a time, a place, a date, a person, or an event). The information may be unique for prompting the user to securely authenticate as part of KBA. The information may include a question and an answer specific to the media content. Multiple different types of information may be specified for the media content. The information may be that which unauthorized users would not be able to determine based on known malicious techniques. For example, the media content may be presented to the user for KBA authentication as part of MFA to prompt the user for the relevant information (e.g., a question and an answer) about the media content registered by the user. The graphical interface may enable a user to specify information (e.g., device information or phone number) about one or more trusted devices for MFA, in particular KBA. A trusted device may be operated as a client for implementing KBA as part of MFA. Media content and information about the media content registered for KBA may be stored by the IDM system for determining subsequent MFA based on KBA. The registration for KBA may be associated with the trusted device(s) specified for registration. MFA along with KBA may be used for controlling access to resources and/or for recovery of authentication information (e.g., recovery of credential information).

In some embodiments, the IDM system may be configured to implement KBA with MFA using media content registered for KBA. During authentication, the IDM system may detect that KBA is to be implemented for authentication based on registration of media content by a user for KBA. The IDM system may communicate with one or more clients to faciliate MFA including KBA. In at least one embodiment, multiple clients may be used to perform authentication including KBA. For example, a first client may be operated to initiate an authentication process, which may be multi-factor and may include KBA. For KBA, the IDM system may securely communicate with another client (e.g., a second client) to provide the media content for KBA. The second client may be a client associated as a trusted device for registration of KBA for a user. The media content provided at the second client may prompt the user to view and verify the media content for KBA. A first client may present one or more graphical interfaces to enable the user to complete the KBA by providing information to the first client corresponding to the media content. The information requested may be that which is registered by the user for the KBA. The IDM system may verify the information to determine authentication for the KBA. A similar process of authentication involving multiple clients may be implemented for credential recovery initiated at one of those clients. KBA may include verification of multiple media content. The KBA of media content based on information registered by a user may be useful to ensure security for authentication based on information that is less likely to be compromised.

In some embodiments, the IDM system communicates with clients for MFA including KBA using techniques that improve security and efficiency of communication. The IDM system may communicate with a client using one or more communication systems (e.g., a push notification system or a pull communication system). In a push communication system, the IDM system may initate communciation with the client by sending one or more notifications to the client. In a pull communciation system, the client may initate communciation with the the IDM system by requesting one or more notifications from the IDM system. For example, the client may periodically contact the IDM system to check for any pending messages for the client. Using the pull communication system, APNS or GCM may not be relied upon.

For an authentication process, the IDM system may communicate data (e.g., a unique identifier) specific to a client through a communication system. The data may be generated specific to a client with which the IDM system intends to communicate with. The data may be restricted by one or more criteria (e.g., time). The communication system may provide security mechanisms that limit communication to devices that are registered with the IDM system. For example, the IDM system may register with the communication system to provide a certificate which permits the communication system to communicate information to clients based on having the certificate. The IDM system may further utilize security data specific to registration of a device registered with an application for facilitating communication with the IDM system. The device may use the security data to communicate with the IDM system and/or verify that communications are secure from the IDM system. The IDM system can ensure secure communication with a client that communicates using the data provided to that client with respect to the authentication process. The client can communicate back with the IDM using the data specific to that client so that the IDM system can ensure security of the client as being authorized for communication.

The IDM system may implement MFA, such as KBA, for a user through communication with one or more clients. The clients may include a trusted device that further ensures security for authentication. In at least one embodiment, the IDM system may communicate with a first client (e.g., a mobile device) for KBA by providing data (e.g., a transaction identifier) to the first client, which the first client can use for secure communication during the KBA. The first client may be a device that is registered as trusted. Upon receiving the data, the client may send the data to the IDM system to continue the KBA process. Upon verification of the data, the IDM system may send one or more media content and information (e.g., a question) registered with the media content by the user. The first client may present the media content and the information in a graphical interface to prompt a user for verification of the KBA process. The user can perceive the media content and the information to assess familiarity with the media content and information. The IDM system may provide a graphical interface for the user to provide input for the KBA process to verify the media content and the information. In at least one embodiment, the IDM system may cause a client, such as a second client, to present a graphical interface to prompt a user to provide a response to the media content and information presented at the first client. The second client may be utilized to perform other MFA processes including registration of the second client for KBA. As part of a KBA process, the IDM system can verify the response provided by the user at the second client device to determine authentication of the user. The second client may be a client that initiated MFA including KBA to access one or more resources. The use of multiple clients including a trusted device enables the IDM system to improve security for authentication. The first client may be secure to provide the media content and the information to a legitimate user because the first client is trusted as being in possession of the user. The first client may be identified as associated with the user based on registration of the first client for the user. The IDM system may initiate an authentication process, or MFA of the user, before communicating with the first client for KBA.

A device may be operated as a client that registered as a trusted device for access management. The IDM system may determine that a user operating a client (e.g., a desktop computer) has requested to register another device (e.g., a mobile device) as a trusted device for MFA. The IDM system may provide a graphical interface to the user at the client. The graphical interface may provide instructions including access for downloading an application to install on the mobile device. The user may operate the mobile device to download the application to the mobile device, which is configured for secure communication with the IDM system. The application may be downloaded upon providing information about the user, such as credential information, for authentication of the user. The IDM system may generate data to further faciliate registration of the mobile device as a trusted device with the application. The IDM system may generate data about the IDM system (e.g., an endpoint of contact for communication) and security data (e.g., a token). The security data may be defined by one or more criteria (e.g., time), which limit use of the security data. Registration data, such as data for a QR code, may be generated to include the data about the IDM system and the security data. The IDM system may send the registration data to the client to present to the user for registration of the mobile device. The registration data may be displayed as an image (e.g., a QR code) by the client. The application may be configured to control access to the application based on one or more techniques for authentication (e.g., credential authentication and biometric authentication). The application may be utilized to obtain the registration data presented at the client. For example, the application may operate a camera on the mobile device to capture a photo of the registration data. The application may be configured to process and read the data included in the registration data. The application may generate a key pair (e.g., a public key and a private key) for assymetric encryption. The key pair may be used for communciation with the IDM system. Using the security data in the registration data, the application may communicate with the IDM system to provide the public key. The IDM system can verify authenticity of the mobile device based on the security data provided to the IDM system along with the public key. The IDM system may use the public key to securely communicate with the mobile device as a trusted device. Registration of the mobile device may be complete upon installation of the application and communication of the security data. The mobile device may communicate with the IDM system based on the data about the IDM system included in the registration data.

In some embodiments, a device registered as a trusted device for communication with an IDM system may communicate securely with the IDM system using the appropriate key of the key pair. In some embodiments, communication between a trusted device registered with an application and the IDM system may be defined by a format, including, but not limited to, a markup language (e.g., XML), Javascript notation (JSON) format, as well as plain text. All or part of a communication may be encrypted. For example, a payload of a JSON-formatted message may be generated based on one or more hashing techniques. In some embodiments, the trusted device may communicate security data (e.g., a token or identifier) in the payload, which is hashed and then encrypted. The security data may be provided by the IDM system in a communciation via a communication system. The security data may be provided by the IDM system during registration and/or a subsequent communication. The IDM system can verify the communciation based on the presence of security data included in the communication. The communication can be further verified based on using the one or more hashing techniques and/or the encryption followed by the application. The IDM system can communicate back with the trusted device using the corresponding encryption techniques and/or hashing techniques used by the application, which is configured to communicate with the IDM system.

Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

In at least one embodiment, a method include, based on determining a first authentication of a user to access a resource at a first device, determining, by a computer system of an access management system, a second device associated with the user, where the second device is registered with the access management system for the user, and where the second device is different from the first device. The method may include transmitting, by the computer system, via a communication system, to the second device, encrypted data including an identifier for an application on the second device to communicate with the access management system. The method may include receiving, from the second device, a request by the application for a second authentication of the user, the request including encrypted data. The communication system may be a push notification system or a pull notification system. The method may include determining that the request received from the second device includes the identifier in the encrypted data transmitted to the second device. The method may include obtaining authentication data for determining the second authentication, the authentication data including media content provided by the user at the first device, one or more questions related to the media content, and an answer corresponding to each of the one or more questions. The media content may include an image, a video, or a combination thereof. The method may include initiating, by the computer system, an authentication process for the second authentication, the authentication process including: sending, to the second device, the media content, wherein the application displays to the user at the second device the media content; and sending, to the first device, the one or more questions related to the media content, wherein the first device displays to the user the one or more questions. Sending the media content and sending the one or more questions may occur concurrently. The method may include receiving, from the first device, a response by the user to the one or more questions corresponding to the media content. The method may include determining, by the computer system, whether the response satisfies the answer corresponding to each of the one or more questions corresponding to the media content. The method may include, based on determining that the response satisfies the answer corresponding to each of the one or more questions, permitting the first device to access the resource.

In some embodiments, the method may include generating security data for registration of the second device with the application for communication with the access management system. The method may include sending a portion of the security data to the second device for registration of the second device with the application. The request received from the second device may be encrypted using the portion of the security data send to the second device. The media content may be sent to the second device as encrypted using the security data. The method may include generating the identifier, where the identifier is a transaction identifier generated for the second device.

The foregoing, together with other features and embodiments will become more apparent upon referring to the following specification, claims, and accompanying drawings.

BRIEF DESCRIPTION OF THE DRAWINGS

Illustrative embodiments of the present disclosure are described in detail below with reference to the following drawing figures.

DETAILED DESCRIPTION

In the following description, for the purposes of explanation, specific details are set forth in order to provide a thorough understanding of embodiments of the present disclosure. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

I. High-Level Overview of an Access Management System for Multi-Factor Authentication (MFA)

Figure 1:
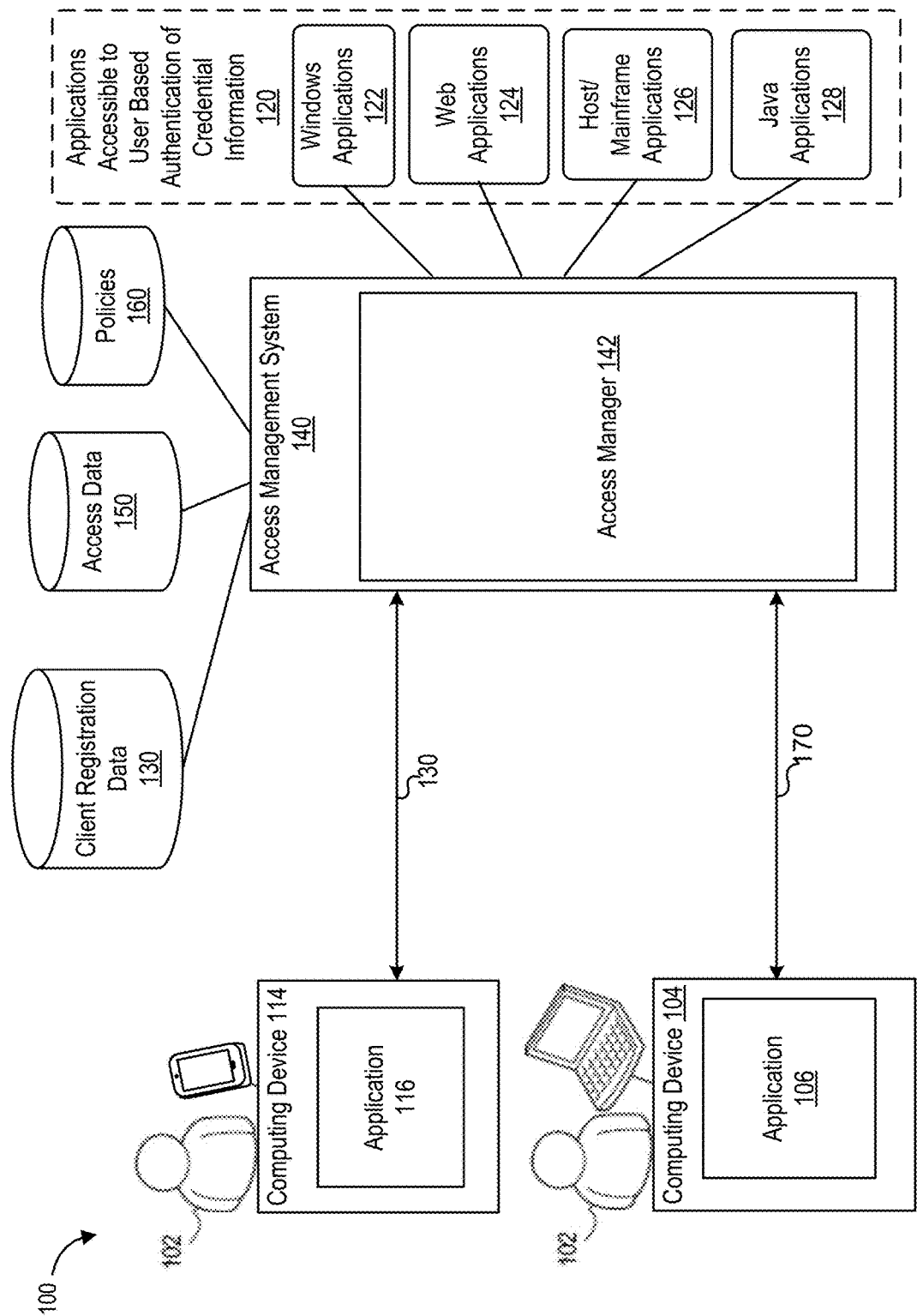
FIGS. 1 and 2 illustrates a high-level diagram of a system for enabling multi-factor authentication for access by an access management system, in accordance with an embodiment.

Some embodiments, such as systems, methods, and machine-readable media, are disclosed for multi-factor authentication using multiple clients (also referred to herein as "client systems" or "client devices"), e.g., a computing device 104 and computing device 114. FIG. 1 illustrates a system 100 in which a user (e.g., user 102) can register a device as a "trusted device" to perform MFA including knowledge-based authentication (KBA) with access management system 140. MFA including KBA may enable devices to be registered as "trusted" devices for authentication of a user via access management system to obtain access to resources. Trusted devices may be registered for facilitating secure authentication of a user associated with those devices.

System 100 can provide single sign-on (SSO) access. A SSO session may provide a user with access to one or more systems after an initial authentication based on authentication of credential information (e.g., a username and a password). Access to a system may provide access to one or more resources. Resources may include any item managed and/or stored by a computing system, such as an application, a document, a file, electronic content, and/or the like. A resource may be identified by a uniform resource locator (URL) or other data indicating a source of the resource.

A client may include a computing device or an application executing on a computing device. In FIG. 1, computing device 104 (e.g., a desktop computer system) may include application 106 executing on computing device 104. Application 106 may be downloaded from a source, such as an online application store, e.g., app store 180. Application 106 may be a web browser that provides access to an access management portal that communicates with access management system 140 to control access to resources. Computing device 114 (e.g., a mobile device) may include application 116 executing on computing device 114. Application 116 may be downloaded from app store 180. Application 116 may be an authentication application that manages authentication for access management system 140. An example of an application may be a mobile authenticator application provided by Oracle, Corporation. As will be described below, applications 106, 116 may be used to registered a client with access management system 140. Application 106 may provide access to resources, while application 116 enables registration and password-less authentication of user 102 at computing device 104.

For purposes of illustration, "session" as described herein includes an SSO session; however, a session may include other types of sessions enabling access to a user. Access management system 140 may provide access one or more resources. Access management system 140 may implement a sign-on system, e.g., a SSO system, which can establish an SSO session to provide SSO access to one or more resources.

Resources may include, without restriction, a file, a web page, a document, web content, a computing resource, or an application. For example, system 100 may include resources such as applications 120 and/or content accessible through those applications 120. A resource may be requested and accessed using an application. For example, an application may request access to a web page from a resource server based on a URL identifying a requested resource. Resources may be provided by one or more computing systems, e.g., a resource server that provides access to one or more resources upon authentication of user 102 in a SSO system.

Access management system 140 may be implemented by a computing system. The computing system may include one or more computers and/or servers (e.g., one or more access manager servers), which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Access management system 140 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Access management system 140 may be implemented using hardware, firmware, software, or combinations thereof.

In some embodiments, access management system 140 may be implemented by multiple computer systems (e.g., access manager servers) deployed as a cluster in a data center, which allows for scalability and high availability. Multiple such geographically dispersed data centers with access manager server clusters can be connected (wired or wirelessly) to constitute a multi-data center (MDC) system. An MDC system may satisfy high availability, load distribution, and disaster recovery requirements of access servers within an enterprise computer network. An MDC system may act as a single logical access server to support SSO services for access management system 140. In at least one embodiment, access management system 140 may be implemented in or with an identity management (IDM) system. The identity management system may be part of an enterprise computer system and/or an cloud computing system.

Access management system 140 may include at least one memory, one or more processing units (or processor(s)), and storage. The processing unit(s) may be implemented as appropriate in hardware, computer-executable instructions, firmware, or combinations thereof. In some embodiments, access management system 140 may include several subsystems and/or modules. For example, access management system 140 may include access manager 142, which may be implemented in hardware, software (e.g., program code, instructions executable by a processor) executing on hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Each of computing devices 104, 114 may communicate with access management system 140 via one or more communication networks. Access management system 140 may communicate with computing device 104 via one or more communication networks 170. Access management system 140 may communicate with computing device 114 via one or more communication networks 130. Examples of communication networks may include a mobile network, a wireless network, a cellular network, a local area network (LAN), a wide area network (WAN), other wireless communication networks, or combinations thereof.

FIG. 1 shows an example in which user 102 can engage in communication with access management system 140 to prevent his access from being denied based on his actions at a client (e.g., computing device 104). In this example, user 102 operating computing device 114 may attempt to access a resource such as an application 106, e.g., any one of applications 120 or the resources accessible through applications 120. Applications 120 may be accessible to user 102 upon successful authentication of credential information for user 102. In attempting to access an application, user 102 may operate an application (e.g., application 106) that manages access to a user's account via access management system 140. For example, application 106 is an access management application that may present interfaces, such as graphical user interfaces (GUIs), some of which are disclosed herein. The application may be provided as part of a service (e.g., a cloud service) or a network-based application. Applications may enable a user to access and perform services provided by access management system 140. Access management system 140 may be configured to run one or more services or software applications described in the foregoing disclosure. For example, access management system 140 may provide many SSO services including management of access (e.g., granting/denying access) to resources, automatic sign-on, application password change and reset, session management, application credential provisioning, as well as authentication of a session. In some embodiments, access management system 140 can provide automatic single sign-on functionality for applications 120, such as Windows® applications, Web application, Java® applications, and mainframe/terminal-based applications running or being accessed from client devices. As explained above, access management system 140 may perform authentication of a user (e.g., user 102) operating a client device (e.g., computing device 114). Authentication is a process by which a user verifies that he/she is who he/she claims to be.

Access management system 140 may also provide services or software applications that include non-virtual and virtual environments. In some embodiments, these services may be offered as web-based or cloud services or under Software as a Service (SaaS) model to the users of clients. For example, access management system 140 may be implemented as a cloud computing system that provides a service (e.g., a cloud-based service), such as an identity cloud service (IDCS). The services offered by access management system 140 may include application services. Application services may be provided by access management system 140 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in access management system 140, which may be implemented as a cloud infrastructure system. Users can acquire the application services without the need for customers to purchase separate licenses and support. Various different SaaS services may be provided. Users operating clients may in turn utilize one or more applications to interact with access management system 140 to utilize the services provided by subsystems and/or modules of access management system 140.

In some embodiments, access management system 140 may use one or more policies stored in a data store 160 ("policies") to control access to resources. Policies 160 may include an authentication policy that specifies the authentication methodology to be used for authenticating the user for whom the access must be provided on a given resource. Policies 160 define the way in which the resource access is to be protected (e.g., type of encryption, or the like). Policies 160 may include an authorization policy that specifies the conditions under which a user or group of users has access to a resource. For example, an administrator may only authorize certain users within a group to access particular resources. Access management system 140 may determine authentication for an SSO session based on one or more of policies 160.

Access management system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, access management system 140 is coupled to or includes one or more data stores for storing data such as access data 150, policies 160, and client registration data 130 ("client reg data"). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

Access manager 142 may handle processing to determine whether a valid session exists for user 102 to access a resource. Access manager 142 checks for a valid session for user 102 to access a requested resource that is protected. Access manager 142 may assess validity of a session for user 102 based on consideration of one or more access policies applicable to user 102. Based on determining that a valid session does not exist for user 102, access manager 142 may request credential information ("credentials") from user 102. Successful authentication of the credential information may provide the user with access to one or more resources, which may include a requested resource. Access manager 142 may implement multi-factor authentication to determine authentication of a user. Multi-factor authentication may involve use of multiple, different authentication techniques.

In at least one embodiment, access management system 140 may configure MFA to authenticate a user, such that the MFA may include knowledge-based authentication (KBA) as a step of the MFA. Traditional MFA can be compromised in many different ways as discussed above. KBA may be compromised through different scenarios, some of which may involve use of social networks. According to this disclosure, MFA may be implemented with KBA through use of multiple clients.

One client (e.g., a first client) may be operated by a user for registration of the user for KBA as part of a MFA process. Access manager 142 can register a client associated with a user, such as computing device 104. Registering a client may include configuring an application to be configured to securely communicate with access management system. Information about a registered client may be stored in client reg data 130. Authentication credentials for a user may be stored in access data 150. During registration, access manager 142 may generate or determine security information (e.g., one or more encryption keys) which is shared with clients (e.g., computing device 104 and computing device 114) to support registration and multi-factor authentication of devices by access management system 140. The encryption key may be stored in access data 150. Encryption keys may be used by an application on a client and the access management system to communicate in a secure manner. Encryption performed as disclosed herein may use one or more known techniques for encryption. Security data may be generated by access manager 142 or may be pre-generated by another system. Security data may be encrypted using an encryption key designated for a registered user. Based on successful authentication of the user, a client may present one or more graphical interfaces that are interactive to enable the user to provide input to configure one or more media content (e.g., an image, a video, or an audio file) for KBA authentication.

User 102 may operate computing device 104 to use application 106 to access a portal (e.g., a web page) provided by access management system 140 to register devices, such as computing devices 104, 114, as trusted authentication devices. Computing device 104 may request, though the portal, access management system 140 to access features for registration of a device. A request may be communicated to computing device 104, which in response, prompts user 102 for user credentials to determine authentication of a session. The request may include information (e.g., a URL) to a web page or a user interface (e.g., a web page, portal, or dashboard) to receive credential information. Access manager 142 may perform operations to authenticate credential information for user 102. In some embodiments, access manager 142 may store information about sessions established upon successful authentication of a user. For a SSO session (e.g., SSO authenticated sessions), the SSO session may be managed as a SSO session enabling access to all resources accessible to user based upon successful authentication of credential information for a user. Access manager 142 can determine resources that are protected and, based on authentication sessions, can determine resources that are permitted and/or restricted for a session.

Communications between computing devices 104, 114 and access management system 140 can be received through a gateway system. The gateway system may support access management services. For example, a single sign-on (SSO) gateway may implement one or more access agents, such as agent (e.g., web gate agent), to balance and/or handle requests from clients and access management system 140. In some embodiments, access management system 140 may be implemented in system 100 according to an agent-server model for communication between computing devices 114, 104 and any one of access manager servers implemented for access management system 140. The agent-server model may include an agent component (e.g., a gateway system) and a server component. The agent component may be deployed on a host system and the server component may be deployed on a server, e.g., an access manager server. Computing device 114 may be a workstation, personal computer (PC), laptop computer, smart phone, wearable computer, or other networked electronic device.

Access management system 140 may present user 102 with a request for authentication credentials in the form of a challenge (e.g., via the user's web browser at computing device 114). In some embodiments, user 102 can access an SSO user interface through a client executing on computing device 114 or through a web browser on computing device 114. The SSO user interface may be implemented at access management system 140. Access management system 140 may send the SSO user interface or information (e.g., a URL) enabling access to the SSO user interface.

In some embodiments, an SSO user interface can include a list of the applications that user 102 commonly utilizes. User 102 can manage their credentials and policies associated with applications through the SSO user interface. When user 102 requests to access an application, e.g., application 140, through the SSO user interface, a request may be sent from computing device 114 to access management system 140 to determine a policy type for the application from one or more policies 160 applicable to user 102. Access management system 140 may determine whether a valid session exists for the user and if so, then it can determine user's 102 credential information based on the policy type.

In some embodiments, the request may include an authentication cookie from a previous login that can be used to determine whether user 102 is authorized to retrieve the credential. If authorized, the user can be logged into the application using the credential. In some embodiments, agent can enable users to access applications 120 using SSO services provided by access management system. Access may be provided through a web browser directly, without first accessing the SSO user interface or using a client executing on computing device 114. If user 102 is not authorized, then access management system may request credentials from user 102. The SSO user interface may present an interface to receive input including credential information. The credential information may be sent to access management system 140 to determine authentication of user 102.

In some embodiments, credential types can be supported, such as Oracle Access Management protected resources, federated applications/resources, and form-fill applications. Examples of credential types may include a Smartcard/Proximity card, a token, a public key infrastructure (PKI), a Windows Logon, a lightweight directory access protocol (LDAP) logon, a biometric input, or the like. For OAM protected resources, user requests can be authenticated and then directed to URLs associated with the requested resources. For Federated Applications, links to federated partners and resources can be provided, including business to business (B2B) partner applications and SaaS applications. For form fill applications, templates can be used to identify fields of application web pages through which credentials can be submitted.

Access management system 140 may implement MFA, including KBA, for a user through communication with one or more clients. The clients may include a trusted device that further ensures security for authentication. In at least one embodiment, the IDM system may communicate with a first client 114 (e.g., a mobile device) for KBA by providing data (e.g., a transaction identifier) to the first client 114, which the first client can use for secure communication during the KBA. The first client 114 may be a device that is registered as trusted. Upon receiving the data, the client 114 may send the data to the access management system 140 to continue the KBA process. Upon verification of the data, the access management system 140 may send one or more media content and information (e.g., a question) registered with the media content by the user. The first client 114 may present the media content and the information in a graphical interface to prompt a user for verification of the KBA process. The user can perceive the media content and the information to assess familiarity with the media content and information. The access management system 140 may provide a graphical interface for the user to provide input for the KBA process to verify the media content and the information. In at least one embodiment, the access management system 140 may cause a client, such as a second client 104, to present a graphical interface to prompt a user to provide a response to the media content and information presented at the first client. The second client 104 may be utilized to perform other MFA processes including registration of the second client for KBA. As part of a KBA process, the access management system 140 can verify the response provided by the user at the second client 104 to determine authentication of the user. The second client 104 may be a client that initiated MFA including KBA to access one or more resources. The use of multiple clients including a trusted device enables the access management system 140 to improve security for authentication. The first client 114 may be secure to provide the media content and the information to a legitimate user because the first client 114 is trusted as being in possession of the user. The first client 114 may be identified as associated with the user based on registration of the first client for the user. The access management system 140 may initiate an authentication process, or MFA of the user before communicating with the first client for KBA.

II. Processes for Multi-Factor Authentication (MFA) Using KBA

The some embodiments, such as those disclosed with respect to FIGS. 2-4, 14, and 15, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in flowcharts herein can be implemented by one or more devices and/or computer systems in FIG. 1. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in this disclosure can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

Figure 2:
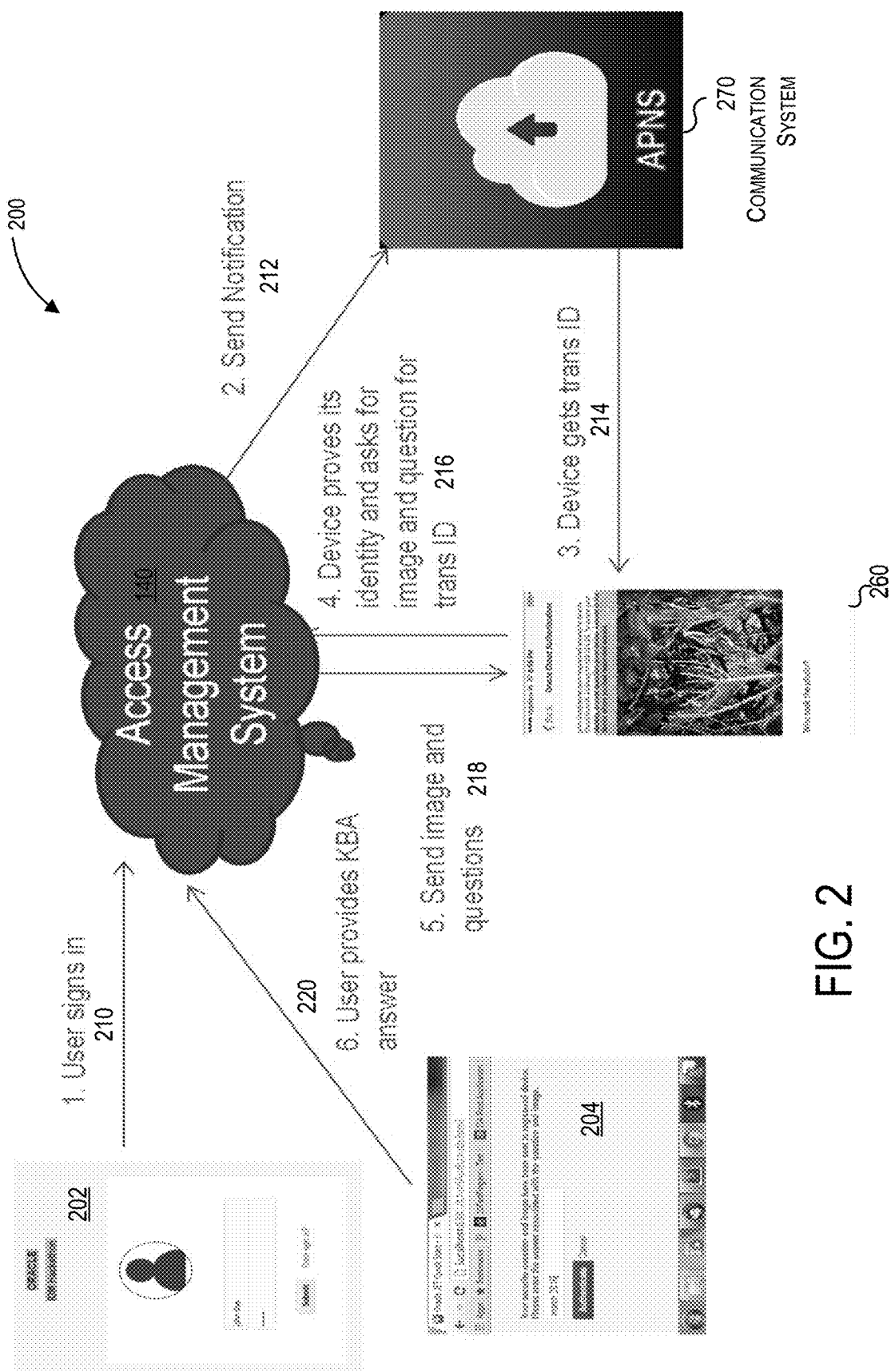

Now turning to FIG. 2, examples are shown of operations 200 for multi-factor authentication including KBA using multiple clients in accordance with an embodiment. At step 210 (Stage 1), a user may operate a first client (e.g., client 114) to access an application (e.g., a web browser) that provides access to a graphical interface (e.g., an access portal) for accessing resources. The application may be used for MFA including KBA of a user after registration of a different client, e.g., a second client (e.g., client 104), as a trusted device of the user with access management system 140.

The user may operate the first client to request access to one or more resources. The application may request the user to provide credential information to authenticate the user. The credential information may be sent to access management system 140. Access management system 140 may determine authentication of the user for MFA to determine access to a resource. The authentication of the user may be based on the resource sought for access. Authentication may be defined based on MFA including KBA facilitated through the second client.

Upon determining that the user is authenticated based on a first authentication of the user's credential information, access management system 140 may determine a second authentication for access to the resource. The second authentication may be implemented using KBA via a trusted device registered with access management system. As described below, access management system may generate data that is encrypted with information to enable a trusted device, such as the second client, to communicate with access management system for KBA. At step 212 (Stage 2), access management system may send encrypted data including an identifier, such as a transaction identifier ("trans ID") to the second client. The encrypted data may be sent in a communication (e.g., a notification) to a second client device via a communication system 270.

Communication system 270 may provide a messaging service and/or a push notification system or a pull notification system for communication. Such communication systems may be requested to facilitate communication (e.g., send notifications) for authentication via a trusted device. Examples of messaging services may include email services such as Gmail™ (a service of Google Inc.) and Yahoo!® Mail (a service of Yahoo! Inc.). Other examples may include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.).

Using communication system 270, a communication may be a message. In some embodiments, a message may provide a notification including an identifier for secure communication with access management system for an authentication process, such as KBA. A "message" or "notification" may include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on.

Communication system 270 may implement a push notification service (e.g., Apple push notification service provided by the Apple® corporation or Google notification service provided by the Google® corporation). The push notification service may facilitate communication between access management system and one or more clients. The push notification service may deliver data, such as an identifier, for an authentication process. Communication system 270 may provide encryption services to facilitate encryption of communication to clients. Clients may be configured to communicate with a push notification system to pull any such notifications from or push any notifications to access management system 140.

Communication system 270 may implement a pull notification service (not illustrated in FIG. 2). The pull notification service may facilitate communication between access management system 140 and one or more clients. For example, a client may be configured to communicate with the pull notification system to request a notification from access management system 140. In such an example, the client may periodically contact access management system 140 to check for any pending messages for the client. Using the pull notification service, APNS or GCM may not be relied upon.

At step 214 (Stage 3), a second client (e.g., a trusted device), which has been registered with an application (e.g., mobile authenticator application) for access management system 140, may receive the data communicated from access management system 140 via communication system 270. A device, such as a mobile device, may be trusted for an account by being in possession of a user with access to the account. The client may access the data in a notification based on a security protocol provided by communication system 270 for communication with a specific device, such as the client. Data in the notification may be encrypted based on a security process implemented by registration of the client with access management system 140. The security process may include using an encryption process, which may be based on an encryption key, determined from registration of the client. The client may have an encryption key that permits it to access data, such as an identifier, in the notification.

At step 216 (Stage 4), the client that receives the identifier, may initiate communication back with access management system 140 using the identifier. The communication with the access management system 140 may be implemented using the application configured on the client for registration with access management system 140. The application may communicate with access management system 140 using one or more security processes. For example, the application on the client may communicate encrypted data to the access management system 140. The encrypted data may include the identifier obtained at step 214. As part of communication at step 216, access management system 140 may determine whether the client (which has the application) is a trusted device registered with access management system 140. Access management system 140 may decrypt the encrypted data using a complimentary security process (e.g., an encryption key of a pair of encryption keys) to decrypt the data. The information in the data may be compared to the identifier which was sent to the client to verify that the identifier matches. If the data is encrypted using a valid encryption key, then the identifier may be obtained by access management system 140 and validated as matching the identifier sent to the client.

Further at step 216, access management system 140 may determine the authentication process for authenticating the user of the client for KBA. Access management system 140 may be determined based on previous operations that KBA authentication is to be performed for the client. One or more media content provided by a user of the client at registration may be retrieved to be provided to the second client. At step 218 (Stage 5), access management system 140 may communicate the media content to the second client using the complimentary security process used for communication with the client. One or more questions may be provided with the media content for KBA. The question(s) may be those which were provided by an authorized user who registered the media content for KBA of the user.

At step 218, the second client may present the media content and the question(s) in a graphical interface to prompt a user for verification for the KBA process. The user can perceive the media content and the question(s) to assess familiarity with the media content and information. The application on the second client may provide a graphical interface 260 that displays the media content and the question(s). Being a trusted device, the second client may display the media content and question(s) registered by an authorized user for registration of the trusted device.

At step 220 (Stage 6), the KBA process is completed and authentication is determined for access to a resource initiated at a first client at Stage 1. Step 220 may happen concurrently with step 218. When media content and question(s) are sent to a trusted device (e.g., a second client), access management system 140 may send or cause a graphical interface 204 to be presented at the first client from Stage 1. Graphical interface 204 may be presented to request input for response to the question(s) presented in graphical interface 260. The application on the first client may receive input via graphical interface 204. The input may correspond to answer(s) for the question(s) provided at Stage 5. At step 220, access management system 140 may verify whether the answers to the questions match what was previously provided by the user being authenticated. Based on determining that the answers match, access management system 140 may send data to the first client indicating a result of the authentication. Access management system 140 may send or cause a graphical interface to be presented to provide access to the requested resource.

Figure 3:
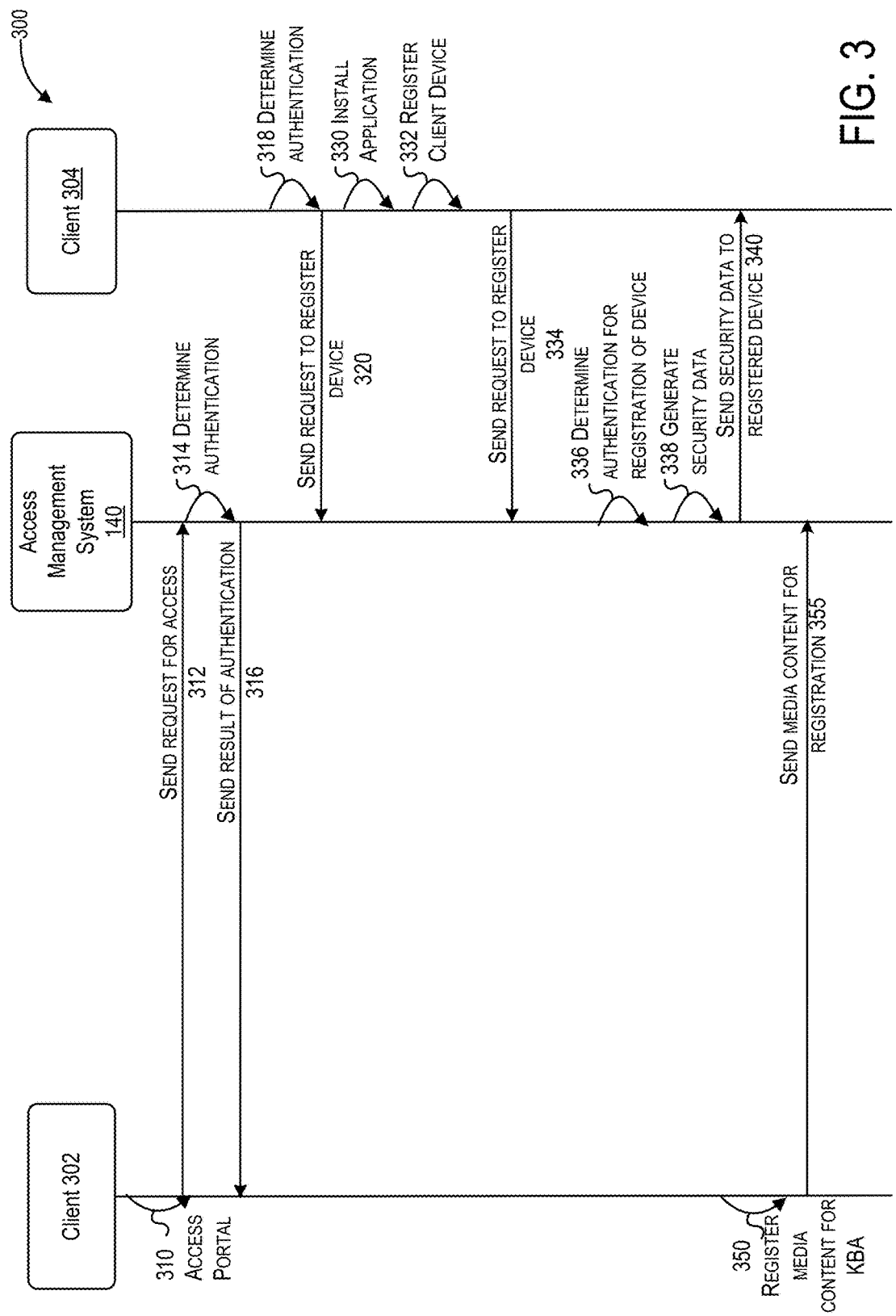
FIGS. 3 and 4 illustrate sequence diagrams of processes for multi-factor authentication using knowledge-based authentication according to some embodiments.

FIG. 3 illustrates a sequence diagram 300 of a process for registration of a device (e.g., device 104) as a trusted device for MFA using KBA. A first device, such as client device 302 (e.g., device 114), may be operated at step 310 to access a portal to register another client device (e.g., 304) as a trusted device. The portal may be accessed through an application or a graphical interface. The portal may be provided by access management system 140. The portal may prompt a user for credential information previously established for registration of the user with access management system 140. At step 312, device 302 may send a request to access management system 140 for access to the portal. The request includes the credential information. In some embodiments, the credential information may be provided in a different communication.

At step 314, access management system 140 determines authentication of the user based on the credential information. At step 316, access management system 140 may send a message to client device 302 indicating a result of the authentication. The message may include data to cause the client device 302 to display in an application or a graphical interface a result of the authentication. At step 318, upon successful authentication, client device 302 may display a graphical interface indicating that the user can register another device (e.g., client device 304) as a trusted device for authentication. The graphical interface may enable a user to provide input to specify a device that is permitted to be registered. At step 320, a message may be sent from client 302 to access management system 140. The message may include information defining a device to be registered.

At step 330, client device 304 may access a portal (e.g., an application or a graphical interface) provided by the access management system 140 to install an application (e.g., an authenticator application) on the client device 304. The portal may be part of an application repository (e.g., an application store). The portal may prompt the user at client device 304 to provide credential information to authenticate the user. The application is downloaded to the client device 304, where the client device 304 installs the application. The application may be downloaded based on successful authentication. At step 332, the application may be operated to register the client device 304 with access management system 140. The application may prompt the user for one or more authentication processes, including biometric authentication and credential information. At step 334, the application may communicate with access management system 140 to initiate access for registration.

At step 336, access management system 140 may determine authentication of the user at the client device 304 before initiating registration of the client device 304 with the application. Based on authentication of the user, access management system 140 may determine registration of the client device 304 with the account previously registered for the user. Access management system 140 may store information identifying the client device 304 as being registered with the account of the user.

At step 338, access management system 140 may generate security data, such as security keys, for secure communication with the client device 304 via the application on the client device 304. The security data may be generated using one or more encryption techniques, such as asymmetric encryption. For example, access management system 140 may generate a pair of security keys, such as a private key and a public key, which can be used for secure communciation between access management system 140 and a trusted device. At step 340, access management system 140 may send a public key to the application on client device 304. The application may use the public key for encryption of communication with access management system 140. Access management system 140 may use the private key for encryption of communication with access management system 140. In some embodiments, the security data may be generated by the application such that a public key is provided to access management system 140 and the application retains a private key.

At step 350, a user may operate client device 302 to configure MFA for enabling access to resources. Access to resources may vary based on the resources being accessed. One or more policies may be defined for access. Each user may have an entitlement that defines privileges for accessing resources. In some embodiments, authentication may be defined by MFA including KBA. To register for KBA, client device 302 may present a user with a graphical interface to provide media content for KBA including one or more questions or information related to each unique media content. The graphical interface may be provided by access management system 140. The graphical interface may enable a user to provide distinct media content and information identifying the media content such as questions and answers. By providing information identifying the media content, such as questions about the media content, security may be improved as it may be difficult for unauthorized users to learn of the answers to questions. At step 355, client device 302 may send the media content including information to access management system 140 for storage in association with an account for a user for authentication of the user.

Figure 4:
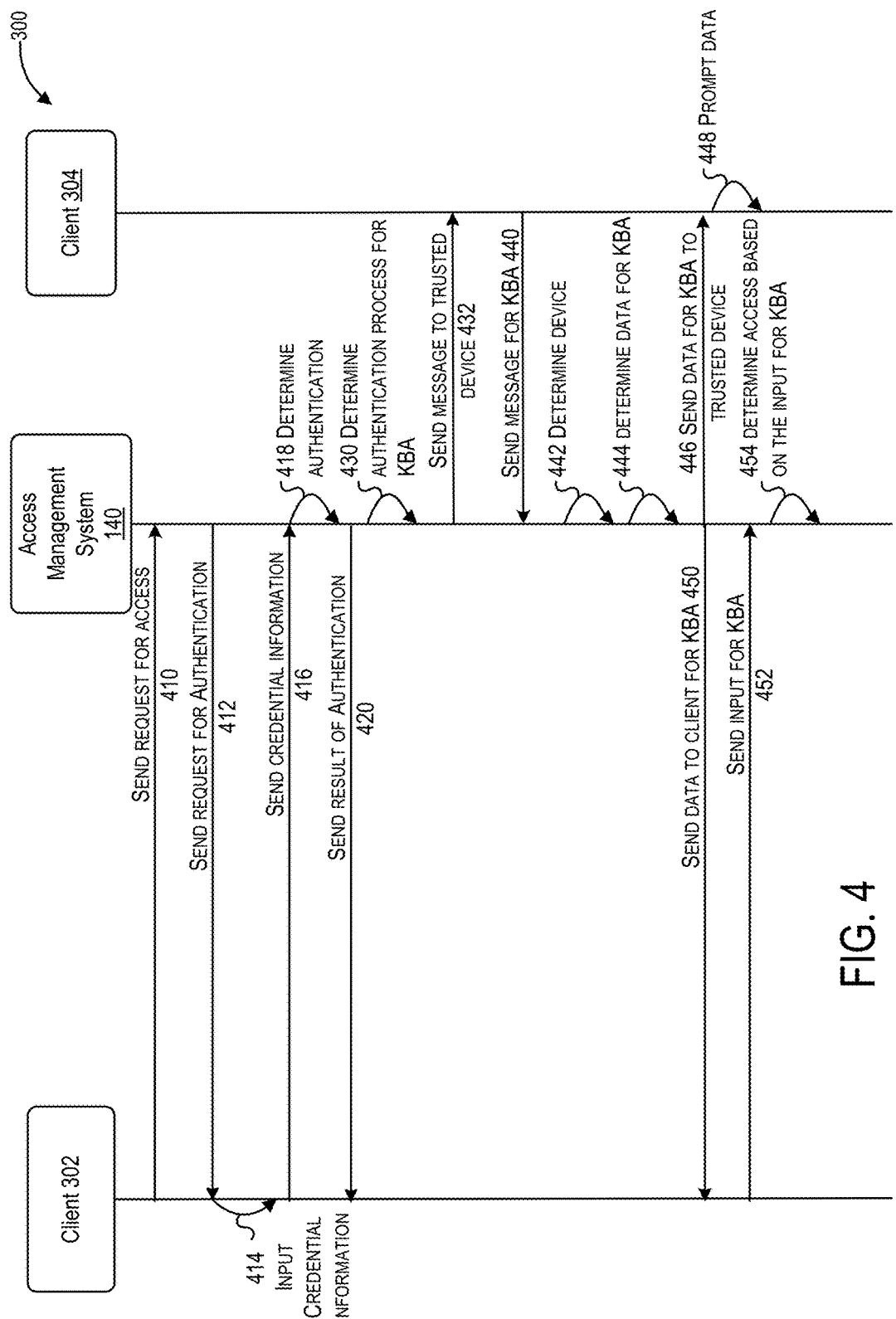

FIG. 4 illustrates a sequence diagram 400 of a process for MFA using KBA. At step 410, client device 302 may be operated by a user to request access to a resource. At step 412, access management system 140 may determine authentication of the user to access the resource. Authentication may be based on MFA using KBA. Similar to FIG. 3, access management system 140 may determine authentication of the user. Access management system 140 may send a request for credential information to client device 302. At step 414, client device 302 may be operated to receive input from the user for the authentication. The input may include the credential information. At step 416, client device 302 may send the credential information. At step 418, access management system 140 may verify authentication based on the credential information. At step 420, a message may be communicated to client device 302 to indicate the result of the authentication.

At step 430, access management system 140 may determine authentication processes for MFA, such as KBA. Access management system 140 may retrieve information stored for KBA registered by the user. At step 432, access management system may determine a device (e.g., client device 304) registered for the user as a trusted device for KBA. Access management system 140 may generate a message to send to the trusted device. The message may include data, such as security data or other data, that is unique for the specific KBA attempt. For example, the message may include an identifier (e.g., a unique transaction identifier) for the trusted device. The identifier may be unique to a specific attempt for KBA for a specific trusted device. The data may be configured with one or more criteria (e.g., number of requests and/or time period) for use to further ensure security in communication for the authentication process. The message may be sent via a communication system (e.g., communication system 270). The message may be encrypted according to a protocol of the communication system or the application on the trusted device. The message may be directed to the trusted device via a communication system. The trusted device may be identified by the communication system based on registration of the trusted device with the communication system.

At step 440, the application on the trusted device (e.g., client device 304) may communicate with access management system 140 for the MFA process, such as KBA. The application on client device 304 may cause the client device to request the MFA process. For example, the application on client device 304 may request the KBA process based on the data received in the message from access management system 140. The request for the KBA may include the data (e.g., identification data) in the message such as the identifier. The identifier may be decrypted from the message from access management system 140 and then encrypted for the request. In some embodiments, communication by the application with access management system 140 may utilize the security data (e.g., a security key) to securely communicate the data from the message. The identification data may include the identifier received in the message from the access management system 140. The identifier may enable access management system 140 to know whether the trusted device is the correct device which is trusted for KBA.

At step 442, access management system 140 may receive the request for authentication (e.g., KBA) from client device 304. Access management system 140 may determine whether the request is from a trusted device, in particular one with which access management system 140 has communicated for KBA. Access management system 140 may process the request for the data in the request. The data may be decrypted using an encryption process based on security established for registration of the application on client device 304. For example, the data in the request may be decrypted using a security key stored in association with registration of the client device 304 as a trusted device. The data in the request may be processed to determine that the data includes identification data received from the client device 304. The identification data may be processed to determine whether it includes the identifier that was previously transmitted in by the access management system 140 to the client device 304. Access management system 140 may check whether the identifier matches that which is stored in association with the client device 304 for registration of the user. The identifier may be checked to determine whether the one or more criteria for the identifier are satisfied for permitting access.

At step 444, access management system 140 may determine data for KBA (e.g., authentication data). The data may include media content and information related to the media content registered for KBA in association with an account of a user to be authenticated. The data may be retrieved based on the KBA for the user to authenticate. The data may include answers or other information related and responsive to the media content for verifying KBA. The media content and information may be used for an authentication process for KBA. For example, the media content and questions associated with the media content may be sent to the trusted device for viewing by a user to be authenticated. The other device from which access to a resource was requested may present a graphical interface to receive input in response to the media content and questions for KBA presented at the trusted device.

At step 446, access management system 140 may initiate an authentication process for KBA authentication, which may be an authentication process in addition to traditional and/or MFA authentication at client device 302. In at least one embodiment, the authentication process may include sending, to the trusted device (e.g., client device 304 which received the message including an identifier), media content and information registered for KBA. For example, the media content may include images and the information may include one or more questions associated with those images. The media content and information communicated to the trusted device may be encrypted using one or more security processes implemented for communication between access management system 140 and the application on the trusted device. For example, the media content and the information may be encrypted with a security key corresponding to a security key provided to the application. In some embodiments, the authentication process may include access management system 140 sending the media content and information to the client device 302 where a request for access to a resource was initiated. Client device 302 and client device 304 may interchange operations performed as disclosed herein.

At step 448, the application receives the media content and the information. The media content and the information may be accessed using the security process implemented for registration of the application. The application may provide a graphical interface that prompts the user with the media content and the information. The prompt may ask the user for answers to each of the questions. The graphical interface may permit input of a response to the prompt.

At step 450, client device 302 received the media content and the information. The client device 302 may provide a graphical interface like client device 304 to present the media content and the information. Client device 302 may be configured to communicate with the security process similar to the application on a trusted device. The graphical interface at client device 302 may be presented to prompt a user to provide a response to information and the media content presented on client device 304. For example, the graphical interface may request input responsive to the media content and the information related to the media content. In some embodiments, the graphical interface at client device 302 may provide the media content. The media content may not be provided so that a user must rely on the trusted device to view the media content to respond to the information (e.g., questions) presented with the media content.

At step 452, a client device, such as client device 302, sends input to access management system 140. The input may correspond to a response to the media content and information (e.g., questions) presented at a trusted device. At step 454, access management system 140 may process the input to determine whether it matches the information stored in association with the media content. For example, the input may be compared to the answer(s) stored in association with the media content registered by the user for KBA. Access management system 140 may determine whether the input satisfies the information stored in association with the media content. Access to a resource is permitted for a client device, e.g., client device 302, based on determining that the input satisfies the information stored in association with the media content. Access to a resource is denied or not permitted for a client device, e.g., client device 302, based on determining that the input does not satisfy the information stored in association with the media content. Access management system 140 may store data to indicate whether access is permitted. Access management system 140 may send data to a computer system (e.g., a resource system), which provides access to a resource, to indicate whether access is permitted. Access management system 140 may send a message to client device 302 to indicate whether access is permitted. The graphical interface or application at the client device 302 may be modified based on the message to indicate whether access is permitted. Access may be provided to a resource at the client device based on whether access is permitted.

III. Interfaces for Multi-Factor Authentication Using Knowledge-Based Authentication FIGS. 5-13 illustrate interfaces, e.g., graphical user interfaces (GUIs) for multi-factor authentication in an access management system, in accordance with an embodiment. The GUIs in FIGS. 5-13 may be displayed as part of an access portal, such as a web site, or an application. Each of the GUIs in FIGS. 5-13 may be displayed in an application on a device. Each of the GUIs may be accessed from access management system 140 or a may be part of an application installed on a client for communication with access management system 140. The GUIs may be modified to display additional information or one or more additional GUIs such as those described with reference to the following figures. In response to interaction with a GUI as disclosed herein, an updated or new graphical interface can be generated.

In this disclosure, "an element" may be included in a GUI. An element may be displayable and/or part of a GUI. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the GUI. For example, an interactive element can be one of many in a GUI. For a computer system that displays any of the GUIs disclosed herein, the computer system can receive one or more inputs corresponding to an interaction with a GUI. The input(s) can be processed to determine the interaction(s) to the GUI.

Figure 5:
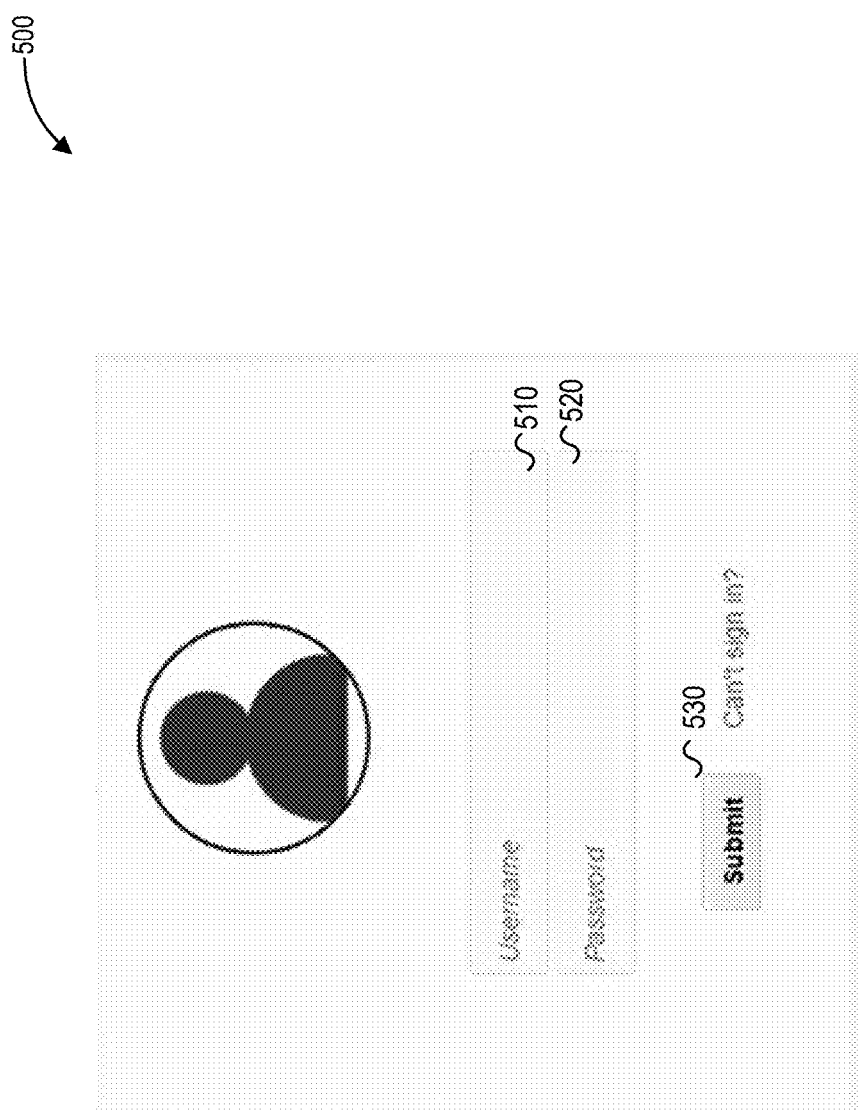
FIGS. 5-13 illustrate interfaces for multi-factor authentication using knowledge-based authentication according to some embodiments.

Now turning to FIG. 5 is a GUI 500 for receiving credential information (e.g., a user name and a password). GUI 500 may be presented at a computing device 104 or client 304 operated by a user. GUI 500 may be presented in an application (e.g., browser). GUI 500 may be presented the first time a user operates the client device to obtain access to resources by authentication via access management system 140. GUI 500 may be presented when a user requests access to a resource. GUI 500 may be presented as part of an application (e.g., "OOW Access Portal"), such as an access portal application or website, supporting access management system 140. GUI 500 may be presented as part of one or more authentication processes for registering the client device for a user. Any type of authentication process may be implemented in GUI 500.

GUI 500 may include one or more interactive elements to provide input (e.g., credential information) for an authentication process. Interactive element 510 in GUI 500 may receive input for user identification (e.g., "username"). Interactive element 520 in GUI 500 may receive input for credentials (e.g., "password"). Interactive element 530 in GUI may be interactive to submit a request for authentication with input received in the interactive elements.

Upon interaction with interactive element 530, credential information input into GUI 500 may be sent from the computing device 304 to access management system 140 for authentication. The credential information may be that which he user has previously provided for registration with access management system 140.

Figure 6:

FIG. 6 illustrates a GUI 600 for registering a device (e.g., device 304) as a trusted device for MFA including KBA. GUI 600 may be presented at a client device (e.g., client device 302) where device 304 is being registered as a trusted device. GUI 600 may include one or more elements that are interactive to specify information identifying media content to be registered with access management system 140 for KBA. GUI 600 may include an element to specify a device (e.g., a mobile device) for which to register media content for KBA. The element may be interactive to receive an email address and/or a mobile phone number that is associated with the device. The mobile phone number may be used to communicate with the device for KBA. GUI 600 may in include one or more elements that are interactive to provide input to select or indicate a location of media content (e.g., images, audio, or video) and information (e.g., questions and answers) related to the media content. Different media content may be registered for different devices. GUI 600 may include an element ("enroll") to initiate a request from the client device to access management system 140 to register a device as a trusted device.

Figure 7:
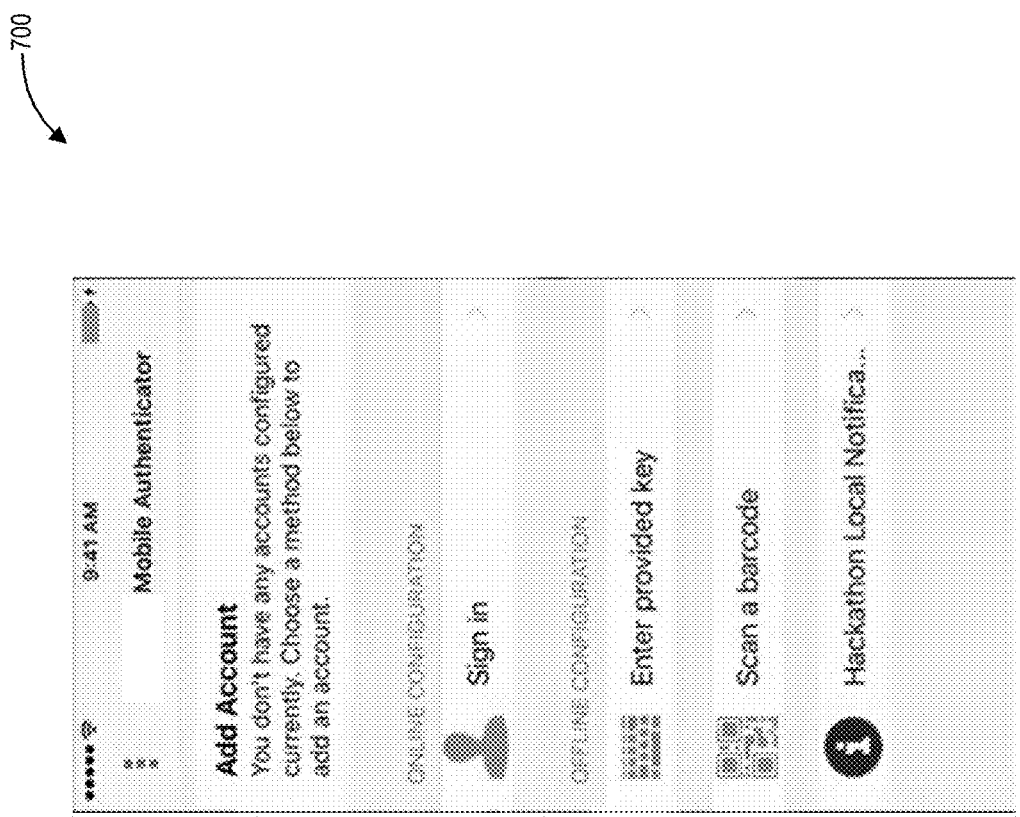

FIG. 7 illustrates a GUI 700 of an application ("Mobile Authenticator") installed on a device registered as a trusted device for KBA according to some embodiments. GUI 700 may be presented to enable a trusted device to communicate with access management system 140 to enable KBA. GUI 700 may include an element that is interactive to access ("Sign in") to access management system with one or more authentication processes including verification of credential information and/or biometric authentication. GUI 700 may include one or more elements that enable configuration of the trusted device for communication with access management system 140.

Figure 8:
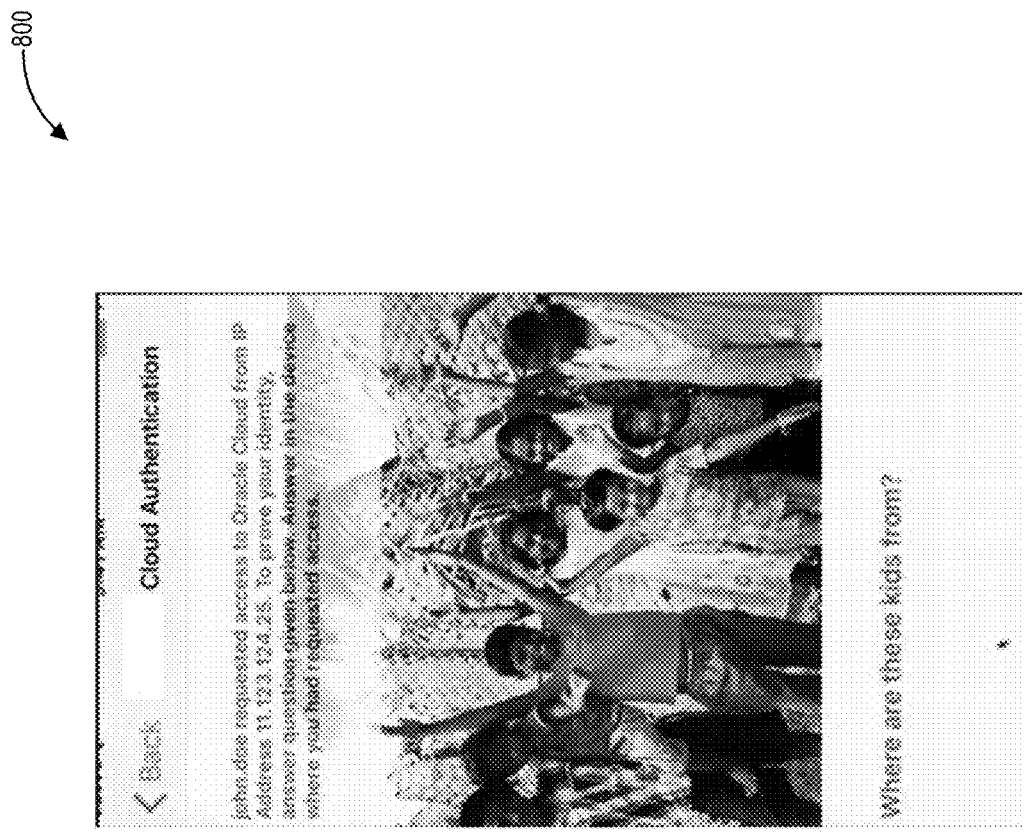
Figure 9:
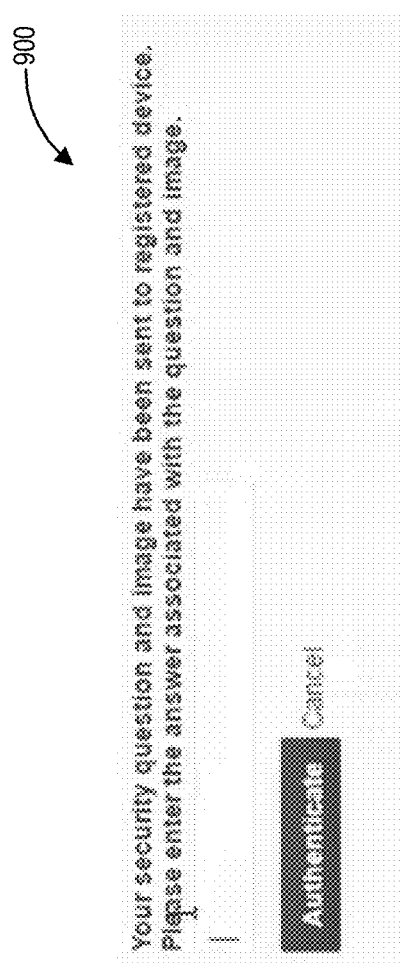

FIG. 8 illustrates a GUI 800 of an application ("Mobile Authenticator") installed on a device registered as a trusted device for KBA according to some embodiments. GUI 800 displays media content (e.g., an image) presented along with a question (e.g., "Where are these kids from?") received by the trusted device from access management system 140. GUI 800 may be presented for KBA of a user. FIG. 9 illustrates a GUI 900 presented at a device (e.g., a client device 302) for KBA. GUI 900 may be presented at a device where access to a resource is requested. The device may be difference from the trusted device where media content and information is presented. GUI 900 may display one or more elements that receive input in response to the media content and information presented in a GUI (e.g., GUI 800) of a trusted device.

Figure 10:
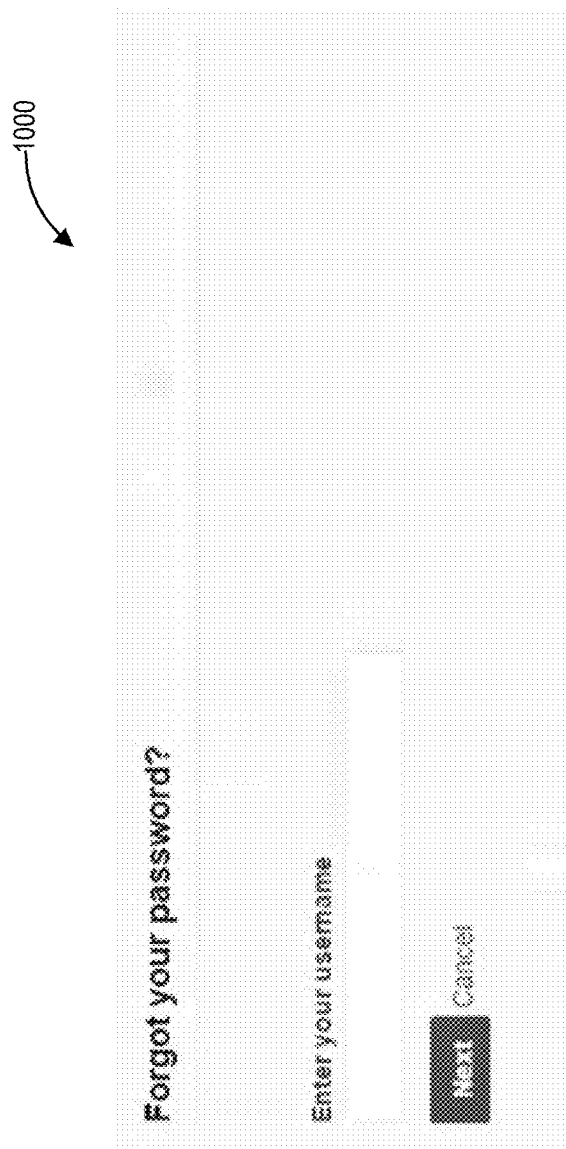
Figure 11:
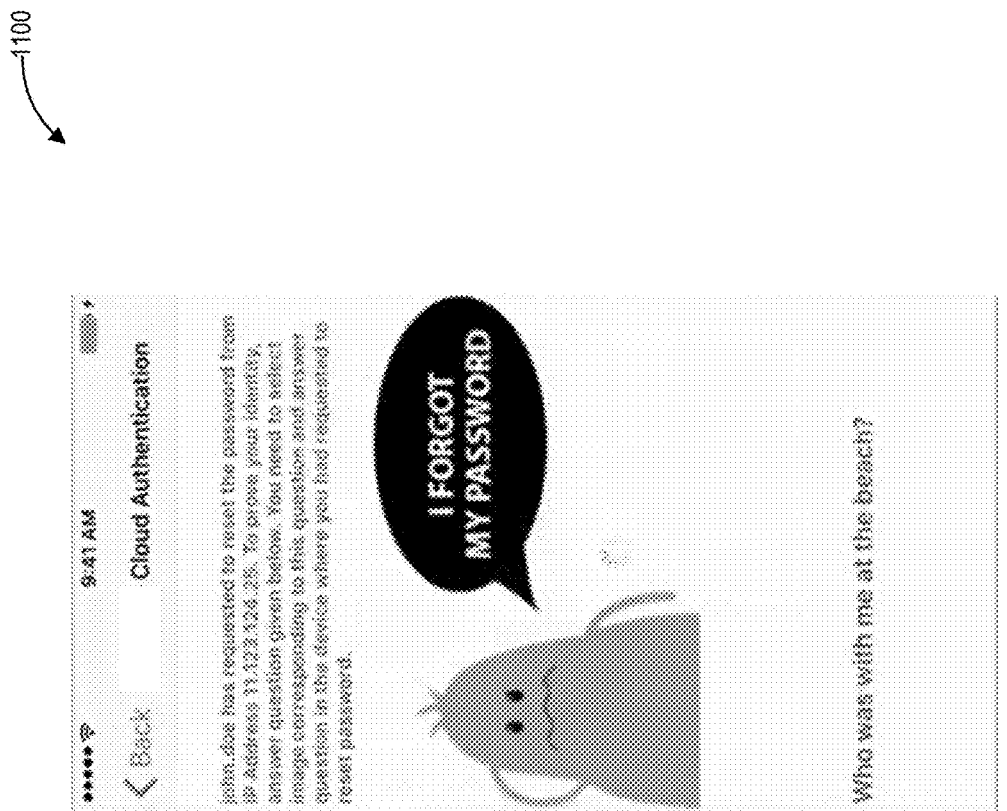
Figure 12:
Figure 13:
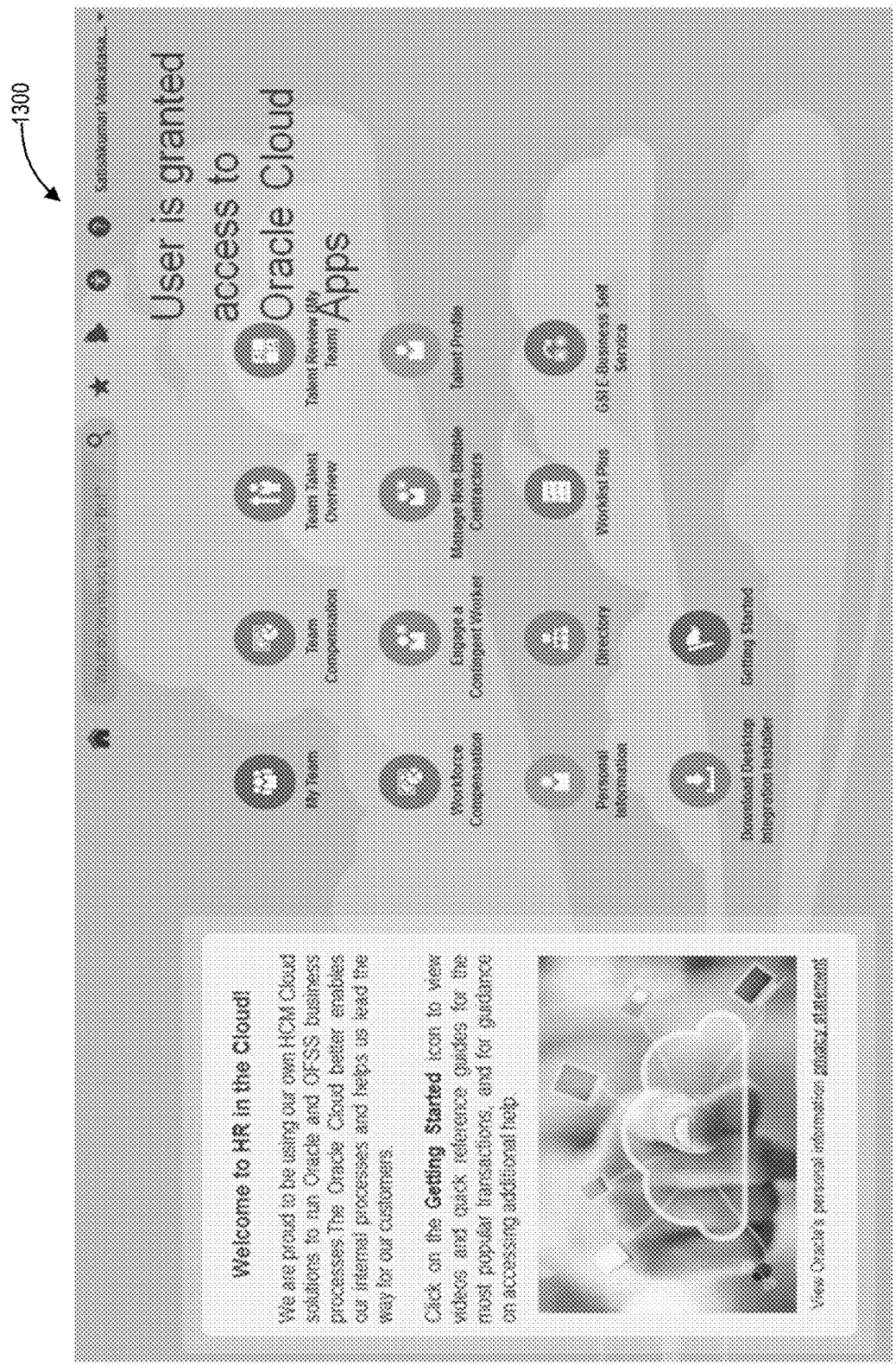

FIG. 10 illustrates a GUI 1000 for receiving input to request a reset of credential information from a client device. GUI 1000 may be presented at a device where access is requested to a resource. The device may be different from a trusted device. In response to interaction with GUI 1000, GUI 1100 of FIG. 11 may be presented in an application at a trusted device for resetting credential information for KBA. GUI 1100 may present media content including information for KBA to reset the credential information. GUI 1000 may be adjusted to display a GUI, such as GUI 900 of FIG. 9 to receive input responsive to the media content and information. In at least one embodiment, GUI 1200 of FIG. 12 may be presented in a client device from which a request is made to reset credential information. GUI 1200 may present media content and an element to receive input responsive to media content viewed at a trusted device. GUI 1300 of FIG. 13 is shown on a client device, such as client device 302 where access or reset of access is requested. GUI 1300 may display an access portal to one or more resources accessible to the user.

IV. Flowchart of a Process for MFA Using KBA

Figure 14:
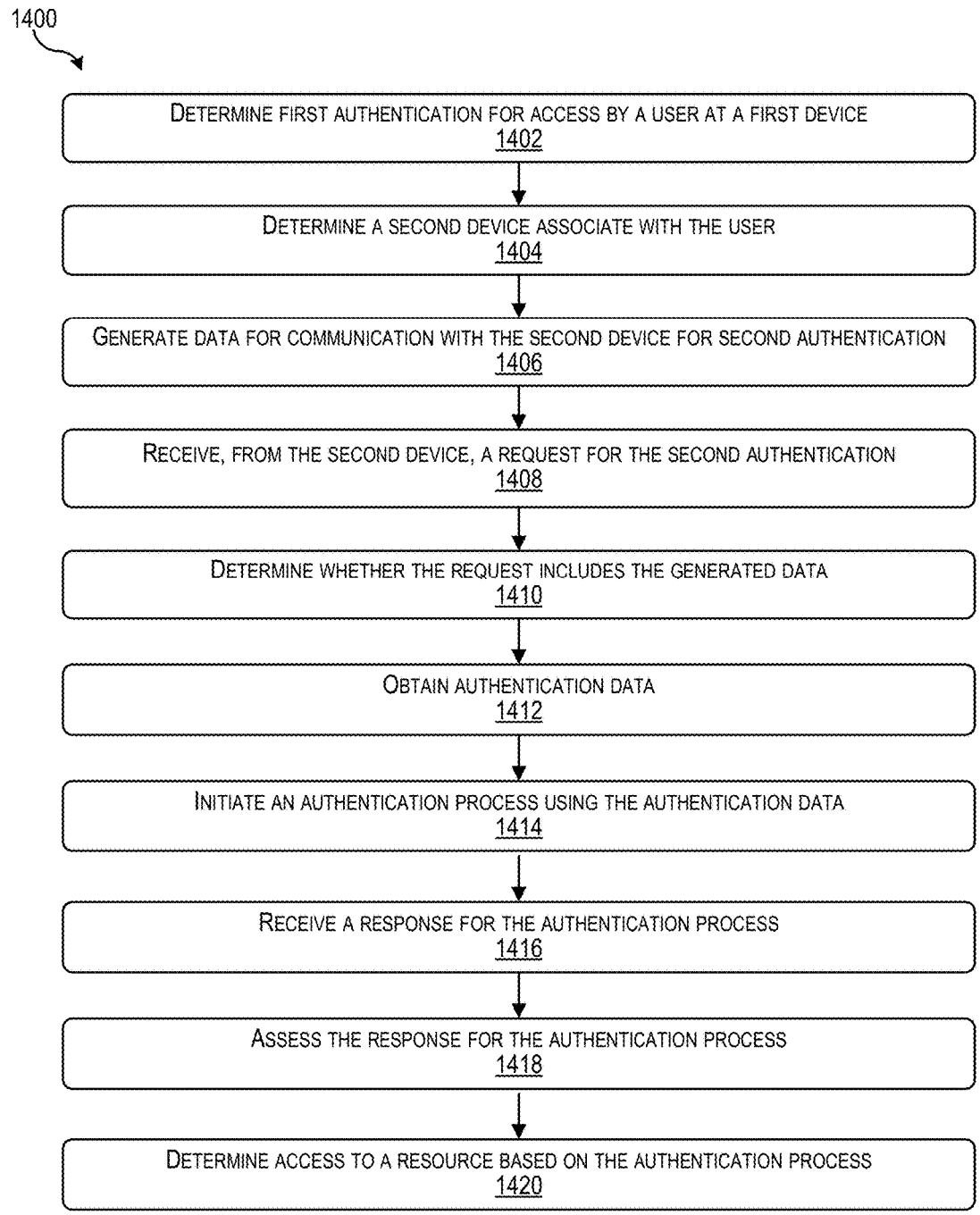
FIG. 14 illustrates a flowchart of a process for multi-factor authentication using knowledge-based authentication according to some embodiments.

FIG. 14 illustrates a flowchart 1400 of a process for MFA including KBA. Flowchart 1400 may be implemented by an access management system (e.g., access management system 140). At block 1402, a first authentication for access at a first device by a user is determined. The access may be for access to a resource. The authentication may be based on credential information provided by a user at a client device (e.g., device 302). At block 1404, a second device associated with a user is determined. The second device may be registered with an access management system as a trusted device.

At block 1406, data is generated for facilitating communication with the second device for KBA. The data may be encrypted. The data may include identification data (e.g., a transaction identifier) to communicate with the access management system. The identification data may be used by an application on the second device to communicate with the access management system. The data may be sent to the second device. The data may be sent via a communication system. At block 1408, a request may be received from the second device. The request may be by the application for a second authentication (e.g., KBA). The request may include the identification data. At block 1410, the request is analyzed to determine that it includes the identifier in the encrypted data transmitted to the second device.

At block 1412, authentication data is obtained for determining the second authentication. The authentication data may include media content provided by the user at the first device. The authentication may include one or more questions related to the media content and an answer corresponding to each of the one or more questions.

At block 1414, an authentication process is initiated for the second authentication, the authentication process. The authentication process may include sending, to a second device (e.g., a trusted device), the media content. The application displays to the user at the second device the media content. The authentication process may include sending, to a first device (e.g., a device that requests access to a resource), the one or more questions related to the media content. The first device displays to the user the one or more questions. The media content and the one or more questions may be sent concurrently to the second device and the first device, respectively. As the trusted device, the second device may display the media content, but the first device may be used to respond to questions related to the media content.

At block 1416, a response, by the user, to the one or more questions may be received from the first device. At block 1418, the response is assessed to determine whether it satisfies the answer corresponding to each of the one or more questions corresponding to the media content. At block 1420, access to the resource is permitted at the first device based on whether the response satisfies the answer. Based on determining that the response satisfies the answer corresponding to each of the one or more questions, the first device is permitted to access the resource. Based on determining that the response does not satisfy the answer corresponding to each of the one or more questions, the first device is blocked or not permitted to access the resource.

V. General Computer Systems for Access Management

Figure 15:
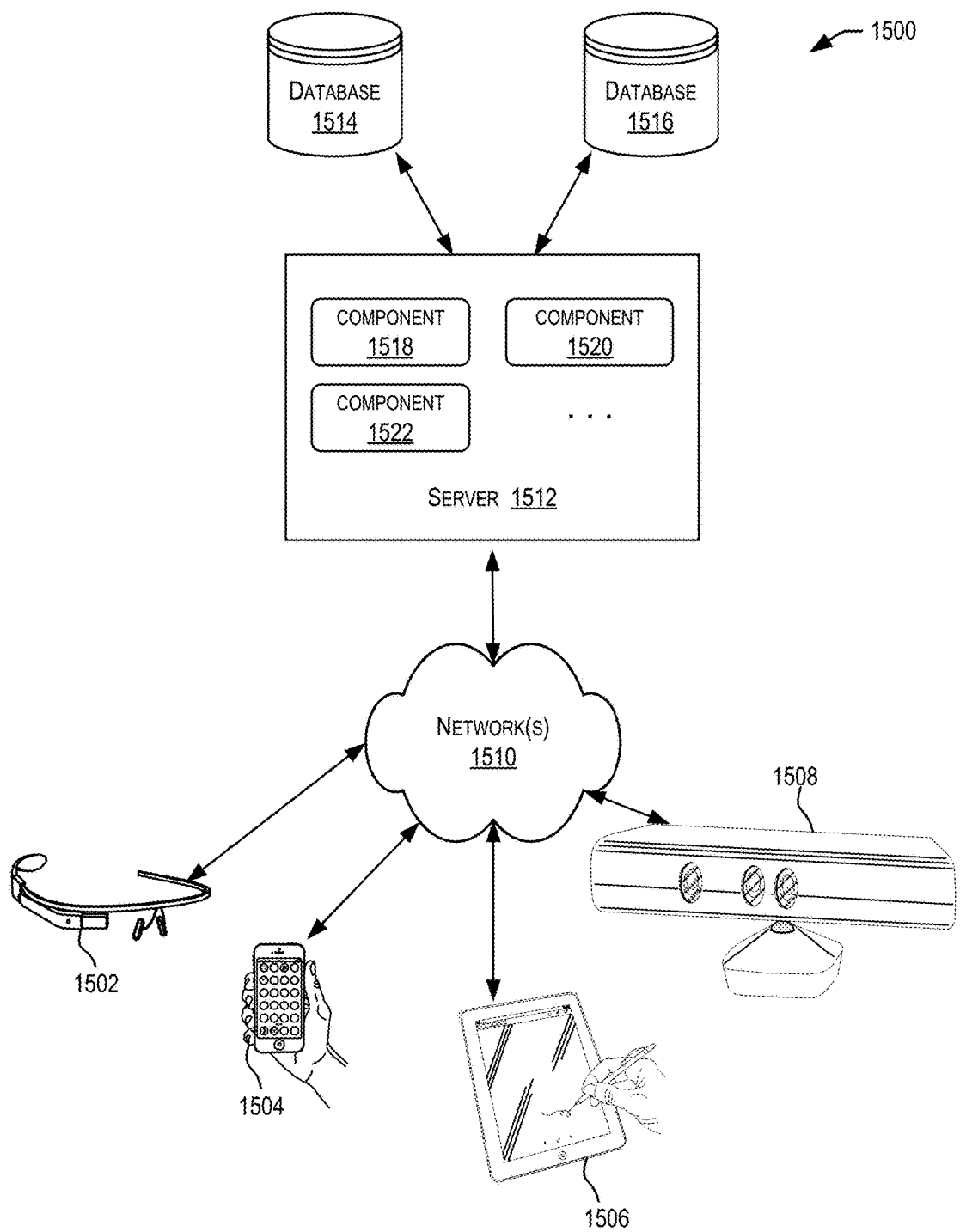
FIG. 15 depicts a simplified diagram of a distributed system for implementing an embodiment.

FIG. 15 depicts a simplified diagram of a distributed system 1500 for implementing an embodiment. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications. In certain embodiments, server 1512 may also provide other services or software applications can include non-virtual and virtual environments. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in FIG. 15, software components 1518, 1520 and 1522 of system 1500 are shown as being implemented on server 1512. In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in FIG. 15 is thus one example of a distributed system for implementing an embodiment system and is not intended to be limiting.

Client computing devices 1502, 1504, 1506, and/or 1508 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1510.

Although distributed system 1500 in FIG. 15 is shown with four client computing devices, any number of client computing devices may be supported. Other devices, such as devices with sensors, etc., may interact with server 1512.

Network(s) 1510 in distributed system 1500 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1510 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1512 can include one or more virtual machines running virtual operating systems, or other computing architectures involving virtualization. One or more flexible pools of logical storage devices can be virtualized to maintain virtual storage devices for the server. Virtual networks can be controlled by server 1512 using software defined networking. In various embodiments, server 1512 may be adapted to run one or more services or software applications described in the foregoing disclosure. For example, server 1512 may correspond to a server for performing processing as described above according to an embodiment of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. These databases may provide a mechanism for storing information such as user interactions information, usage patterns information, adaptation rules information, and other information used by embodiments of the present disclosure. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle that are adapted to store, update, and retrieve data in response to SQL-formatted commands.

Figure 16:
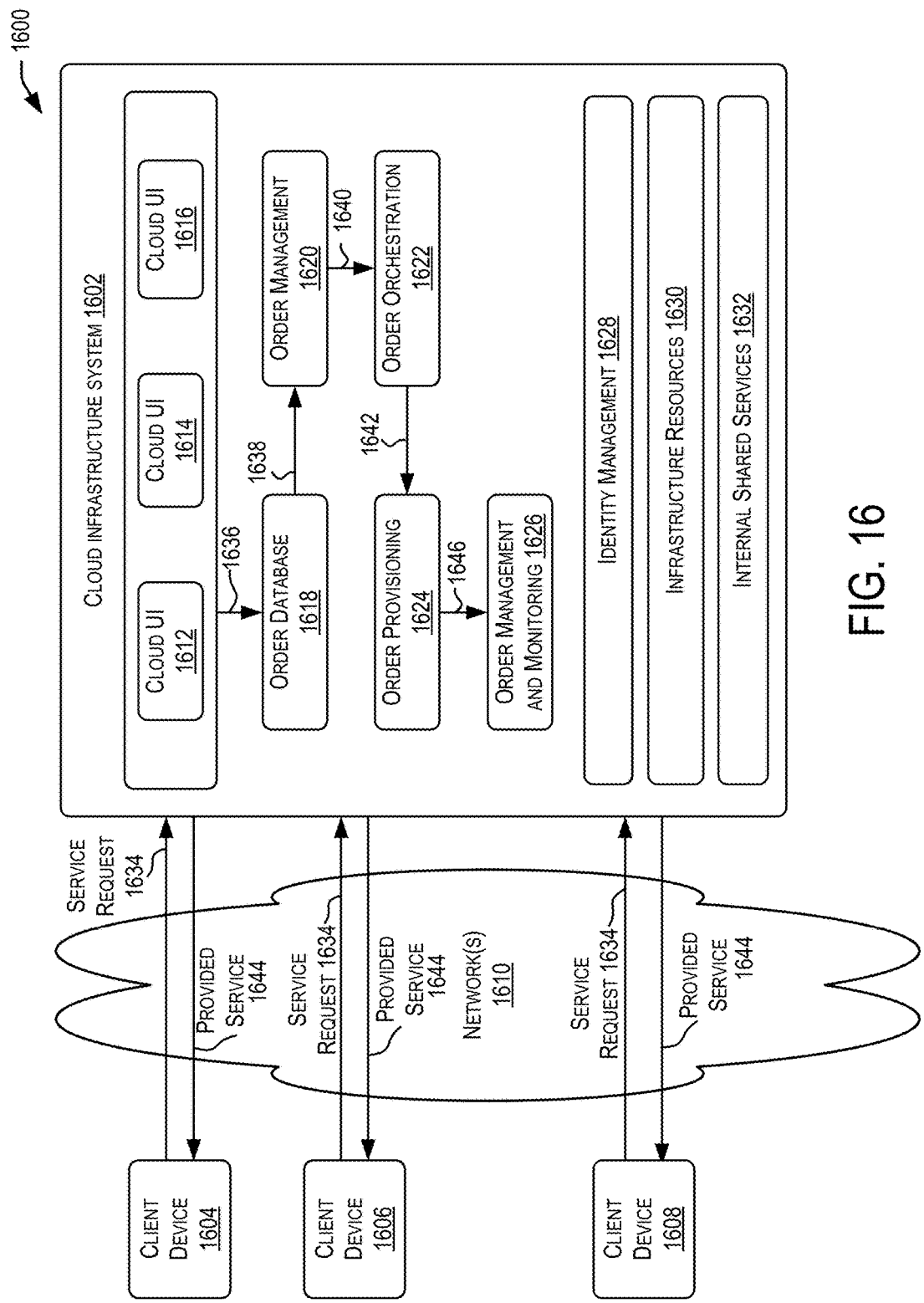
FIG. 16 illustrates a simplified block diagram of one or more components of a system environment in which services may be offered as cloud services, in accordance with an embodiment of the present disclosure.

In some embodiments, a cloud environment may provide one or more services. FIG. 16 is a simplified block diagram of one or more components of a system environment 1600 in which services may be offered as cloud services, in accordance with an embodiment of the present disclosure. In the illustrated embodiment in FIG. 16, system environment 1600 includes one or more client computing devices 1604, 1606, and 1608 that may be used by users to interact with a cloud infrastructure system 1602 that provides cloud services. Cloud infrastructure system 1602 may comprise one or more computers and/or servers that may include those described above for server 1512.

It should be appreciated that cloud infrastructure system 1602 depicted in FIG. 16 may have other components than those depicted. Further, the embodiment shown in FIG. 16 is only one example of a cloud infrastructure system that may incorporate an embodiment of the present disclosure. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for client computing devices 1502, 1504, 1506, and 1508. Client computing devices 1604, 1606, and 1608 may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602. Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between client computing devices 1604, 1606, and 1608 and cloud infrastructure system 1602. Each network may be any type of network familiar to those skilled in the art that can support data communications using any of a variety of commercially-available protocols, including those described above for network(s) 1510.

In certain embodiments, services provided by cloud infrastructure system 1602 may include a host of services that are made available to users of the cloud infrastructure system on demand. Various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1602 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1602 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle Corporation) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1602 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1602 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform, and other resources.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 to enable provision of services by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in FIG. 16, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In an exemplary operation, at step 1634, a customer using a client device, such as client computing devices 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI) such as cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

At step 1636, the order information received from the customer may be stored in an order database 1618. If this is a new order, a new record may be created for the order. In one embodiment, order database 1618 can be one of several databases operated by cloud infrastructure system 1602 and operated in conjunction with other system elements.

At step 1638, the order information may be forwarded to an order management module 1620 that may be configured to perform billing and accounting functions related to the order, such as verifying the order, and upon verification, booking the order.

At step 1640, information regarding the order may be communicated to an order orchestration module 1622 that is configured to orchestrate the provisioning of services and resources for the order placed by the customer. In some instances, order orchestration module 1622 may use the services of order provisioning module 1624 for the provisioning. In certain embodiments, order orchestration module 1622 enables the management of business processes associated with each order and applies business logic to determine whether an order should proceed to provisioning.

As shown in the embodiment depicted in FIG. 16, at step 1642, upon receiving an order for a new subscription, order orchestration module 1622 sends a request to order provisioning module 1624 to allocate resources and configure resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. This enables order orchestration module 1622 to be isolated from implementation details, such as whether or not services and resources are actually provisioned on the fly or pre-provisioned and only allocated/assigned upon request.

At step 1644, once the services and resources are provisioned, a notification may be sent to the subscribing customers indicating that the requested service is now ready for use. In some instance, information (e.g. a link) may be sent to the customer that enables the customer to start using the requested services.

At step 1646, a customer's subscription order may be managed and tracked by an order management and monitoring module 1626. In some instances, order management and monitoring module 1626 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1600 may include an identity management module 1628 that is configured to provide identity services, such as access management and authorization services in cloud infrastructure system 1600. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

Figure 17:
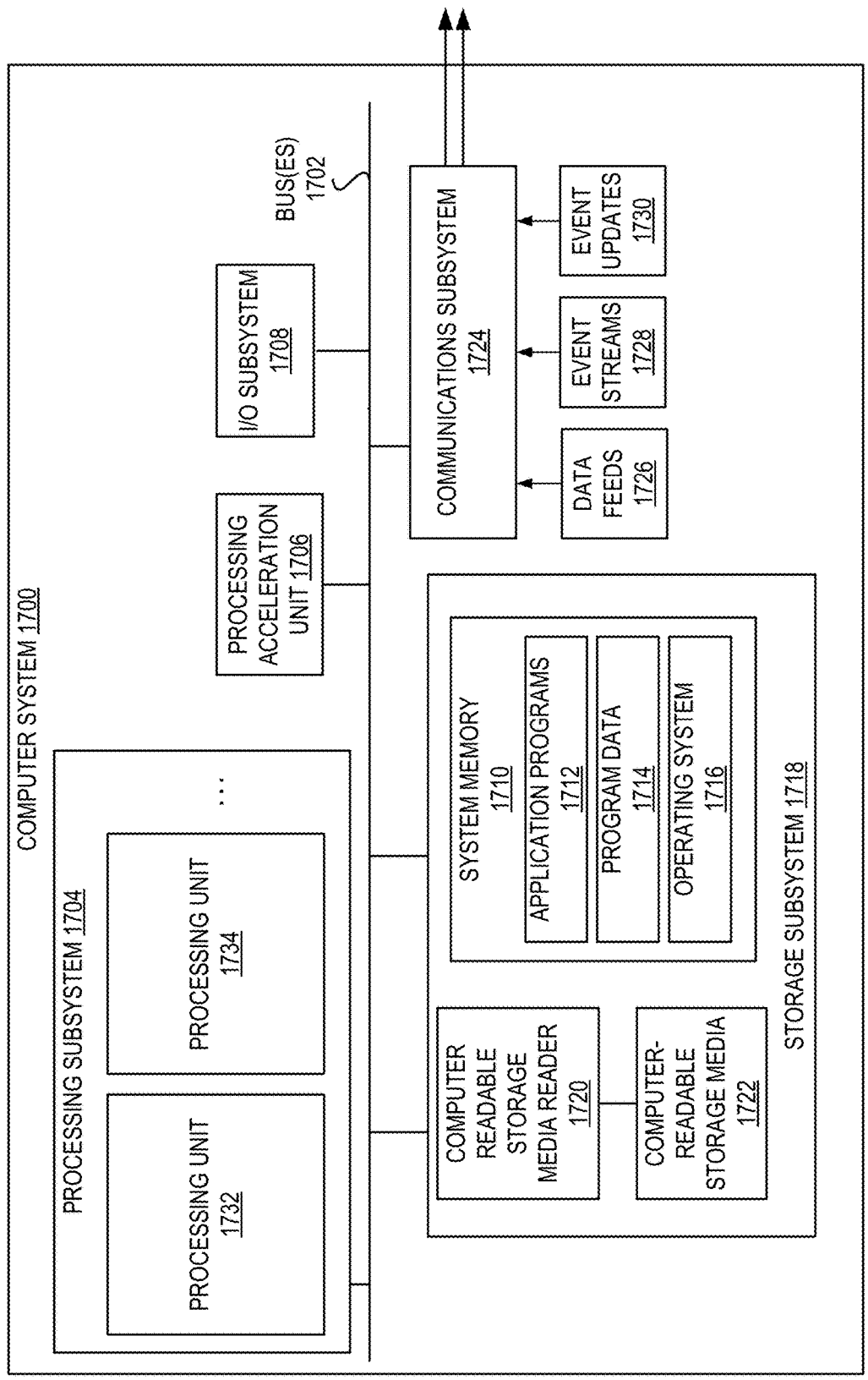
FIG. 17 illustrates an exemplary computer system that may be used to implement an embodiment of the present disclosure.

FIG. 17 illustrates an exemplary computer system 1700 that may be used to implement an embodiment of the present disclosure. In some embodiments, computer system 1700 may be used to implement any of the various servers and computer systems described above. As shown in FIG. 17, computer system 1700 includes various subsystems including a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 may include tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1704 controls the operation of computer system 1700 and may comprise one or more processing units 1732, 1734, etc. A processing unit may include be one or more processors, including single core or multicore processors, one or more cores of processors, or combinations thereof. In some embodiments, processing subsystem 1704 can include one or more special purpose co-processors such as graphics processors, digital signal processors (DSPs), or the like. In some embodiments, some or all of the processing units of processing subsystem 1704 can be implemented using customized circuits, such as application specific integrated circuits (ASICs), or field programmable gate arrays (FPGAs).

In some embodiments, the processing units in processing subsystem 1704 can execute instructions stored in system memory 1710 or on computer readable storage media 1722. In various embodiments, the processing units can execute a variety of programs or code instructions and can maintain multiple concurrently executing programs or processes. At any given time, some or all of the program code to be executed can be resident in system memory 1710 and/or on computer-readable storage media 1722 including potentially on one or more storage devices. Through suitable programming, processing subsystem 1704 can provide various functionalities.

In certain embodiments, a processing acceleration unit 1706 may be provided for performing customized processing or for off-loading some of the processing performed by processing subsystem 1704 so as to accelerate the overall processing performed by computer system 1700.

I/O subsystem 1708 may include devices and mechanisms for inputting information to computer system 1700 and/or for outputting information from or via computer system 1700. In general, use of the term "input device" is intended to include all possible types of devices and mechanisms for inputting information to computer system 1700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1718 provides a repository or data store for storing information that is used by computer system 1700. Storage subsystem 1718 provides a tangible non-transitory computer-readable storage medium for storing the basic programming and data constructs that provide the functionality of some embodiments. Software (programs, code modules, instructions) that when executed by processing subsystem 1704 provide the functionality described above may be stored in storage subsystem 1718. The software may be executed by one or more processing units of processing subsystem 1704. Storage subsystem 1718 may also provide a repository for storing data used in accordance with the present disclosure.

Storage subsystem 1718 may include one or more non-transitory memory devices, including volatile and non-volatile memory devices. As shown in FIG. 17, storage subsystem 1718 includes a system memory 1710 and a computer-readable storage media 1722. System memory 1710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1700, such as during start-up, may typically be stored in the ROM. The RAM typically contains data and/or program modules that are presently being operated and executed by processing subsystem 1704. In some implementations, system memory 1710 may include multiple different types of memory, such as static random access memory (SRAM) or dynamic random access memory (DRAM).

By way of example, and not limitation, as depicted in FIG. 17, system memory 1710 may store application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1722 may store programming and data constructs that provide the functionality of some embodiments. Software (programs, code modules, instructions) that when executed by processing subsystem 1704 a processor provide the functionality described above may be stored in storage subsystem 1718. By way of example, computer-readable storage media 1722 may include non-volatile memory such as a hard disk drive, a magnetic disk drive, an optical disk drive such as a CD ROM, DVD, a Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1722 may provide storage of computer-readable instructions, data structures, program modules, and other data for computer system 1700.

In certain embodiments, storage subsystem 1718 may also include a computer-readable storage media reader 1720 that can further be connected to computer-readable storage media 1722. Together and, optionally, in combination with system memory 1710, computer-readable storage media 1722 may comprehensively represent remote, local, fixed, and/or removable storage devices plus storage media for storing computer-readable information.

In certain embodiments, computer system 1700 may provide support for executing one or more virtual machines. Computer system 1700 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1700. Accordingly, multiple operating systems may potentially be run concurrently by computer system 1700. Each virtual machine generally runs independently of the other virtual machines.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to establish a communication channel to one or more client computing devices via the Internet for receiving and sending information from and to the client computing devices.

Communication subsystem 1724 may support both wired and/or wireless communication protocols. For example, in certain embodiments, communications subsystem 1724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

Communication subsystem 1724 can receive and transmit data in various forms. For example, in some embodiments, communications subsystem 1724 may receive input communication in the form of structured and/or unstructured data feeds 1726, event streams 1728, event updates 1730, and the like. For example, communications subsystem 1724 may be configured to receive (or send) data feeds 1726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1724 may be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1700 depicted in FIG. 17 is intended only as a specific example. Many other configurations having more or fewer components than the system depicted in FIG. 17 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. The modifications include any relevant combination of the disclosed features. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   performing a first authentication of a user in response to receiving, from a first device of the user, a request to access a resource;
   based on the first authentication being successful, performing a second authentication of the user to determine whether to permit access to the resource, the second authentication comprising:

identifying, by a computer system of an access management system, a second device associated with the user, wherein the second device is registered with the access management system as a trusted device for the user, and wherein the second device is different from the first device;

transmitting, by the computer system, via a communication system, to the second device, encrypted data including a first identifier, wherein the first identifier is used by an application on the second device when communicating with the access management system;

receiving, from the application, a request to perform the second authentication;

determining that the request to perform the second authentication includes a second identifier;

responsive to determining that the second identifier matches the first identifier, obtaining authentication data, the authentication data including media content provided by the user at the first device for use in connection with the second authentication, one or more questions related to the media content, and one or more answers corresponding to the one or more questions;

sending, to the second device, the media content, wherein the application displays the media content to the user at the second device;

sending, to the first device, the one or more questions related to the media content, wherein the first device displays the one or more questions to the user;

receiving, from the first device, a response by the user to the one or more questions; and determining, by the computer system, whether the response satisfies the one or more answers corresponding to the one or more questions; and based on determining that the response satisfies the one or more answers corresponding to the one or more questions, permitting the first device to access the resource.

2. The method of claim 1, wherein sending the media content and sending the one or more questions occurs concurrently.

3. The method of claim 1, further comprising:

generating security data for use in communication between the application and the access management system; and sending a portion of the security data to the second device in connection with registration of the second device.

4. The method of claim 3, wherein the request to perform the second authentication is encrypted using the portion of the security data sent to the second device.

5. The method of claim 3, wherein the media content sent to the second device is encrypted using the security data.

6. The method of claim 1, wherein the media content is an image.

7. The method of claim 1, wherein the media content is a video.

8. The method of claim 1, further comprising:

generating the first identifier, wherein the first identifier is a transaction identifier generated for the second device.

9. The method of claim 1, wherein the communication system is a push notification system.

10. The method of claim 1, wherein the second device is a mobile device.

11. An access management system comprising:

one or more processors; and a memory accessible to the one or more processors, the memory storing one or more instructions that, upon execution by the one or more processors, cause the one or more processors to:

perform a first authentication of a user in response to receiving, from a first device of the user, a request to access a resource;

based on the first authentication being successful, perform a second authentication of the user to determine whether to permit access to the resource, the second authentication comprising:

identifying a second device associated with the user, wherein the second device is registered with the access management system as a trusted device for the user, and wherein the second device is different from the first device;

transmitting, via a communication system, to the second device, encrypted data including a first identifier, wherein the first identifier is used by an application on the second device when communicating with the access management system;

receiving, from the application, a request to perform the second authentication;

determining that the request to perform the second authentication includes a second identifier;

responsive to determining that the second identifier matches the first identifier, obtaining authentication data, the authentication data including media content provided by the user at the first device for use in connection with the second authentication, one or more questions related to the media content, and one or more answers corresponding to each of the one or more questions;

sending, to the second device, the media content, wherein the application displays the media content to the user at the second device;

sending, to the first device, the one or more questions related to the media content, wherein the first device displays the one or more questions to the user;

receiving, from the first device, a response by the user to the one or more questions; and determining whether the response satisfies the one or more answers corresponding to the one or more questions; and based on determining that the response satisfies the one or more answers corresponding to the one or more questions, permit the first device to access the resource.

12. The access management system of claim 11, wherein sending the media content and sending the one or more questions occurs concurrently.

13. The access management system of claim 11, wherein the instructions, upon execution by the one or more processors, further cause the one or more processors to:

generate security data for use in communication between the application and the access management system; and send a portion of the security data to the second device in connection with registration of the second device.

14. The access management system of claim 13, wherein the request to perform the second authentication is encrypted using the portion of the security data sent to the second device.

15. The access management system of claim 13, wherein the media content sent to the second device is encrypted using the security data.

16. The access management system of claim 11, wherein the instructions, upon execution by the one or more processors, further cause the one or more processors to:
generate the first identifier, wherein the first identifier is a transaction identifier generated for the second device.

17. A non-transitory computer-readable medium storing one or more instructions that, upon execution by one or more processors, causes the one or more processors to:
perform a first authentication of a user in response to receiving, from a first device of the user, a request to access a resource;
based on the first authentication being successful, perform a second authentication of the user to determine whether to permit access to the resource, the second authentication comprising:
identifying, at an access management system, a second device associated with the user, wherein the second device is registered with the access management system as a trusted device for the user, and wherein the second device is different from the first device;
transmitting, via a communication system, to the second device, encrypted data including a first identifier, wherein the first identifier is used by an application on the second device when communicating with the access management system;
receiving, from the application, a request to perform the second authentication;
determining that the request to perform the second authentication includes a second identifier;
responsive to determining that the second identifier matches the first identifier, obtaining authentication data, the authentication data including media content provided by the user at the first device for use in connection with the second authentication, one or more questions related to the media content, and one or more answers corresponding to the one or more questions;
sending, to the second device, the media content, wherein the application displays the media content to the user at the second device;
sending, to the first device, the one or more questions related to the media content, wherein the first device displays the one or more questions to the user;
receiving, from the first device, a response by the user to the one or more questions; and
determining whether the response satisfies the one or more answers corresponding to the one or more questions; and
based on determining that the response satisfies the one or more answers corresponding to the one or more questions, permit the first device to access the resource.

18. The non-transitory computer-readable medium of claim 17, wherein the one or more instructions, upon execution by the one or more processors, further cause the one or more processors to:
generate security data for use in communication between the application and the access management system; and
send a portion of the security data to the second device in connection with registration of the second device.

19. The non-transitory computer-readable medium of claim 17, wherein the one or more instructions, upon execution by the one or more processors, further cause the one or more processors to:
generate the first identifier, wherein the first identifier is a transaction identifier generated for the second device.

20. The non-transitory computer-readable medium of claim 17, wherein sending the media content and sending the one or more questions occurs concurrently.

* * * * *

UNITED STATES PATENT AND TRADEMARK OFFICE
CERTIFICATE OF CORRECTION

PATENT NO. : 10,157,275 B1
APPLICATION NO. : 15/782700
DATED : December 18, 2018
INVENTOR(S) : Venkatasamy et al.

It is certified that error appears in the above-identified patent and that said Letters Patent is hereby corrected as shown below:

On the Title Page

Page 3, Column 1, item [56], Line 41, delete "AIDE/" and insert -- AIDEV/ --, therefor.

In the Specification

Column 3, Line 64, delete "faciliate" and insert -- facilitate --, therefor.

Column 4, Line 27, delete "initate communciation" and insert -- initiate communication --, therefor.

Column 4, Line 29, delete "communciation" and insert -- communication --, therefor.

Column 4, Lines 29-30, delete "initate communciation" and insert -- initiate communication --, therefor.

Column 4, Line 30, delete "the the" and insert -- the --, therefor.

Column 5, Line 46, delete "faciliate" and insert -- facilitate --, therefor.

Column 5, Line 67, delete "assymetric" and insert -- asymmetric --, therefor.

Column 6, Line 27, delete "communciation" and insert -- communication --, therefor.

Column 6, Line 30, delete "communciation" and insert -- communication --, therefor.

Columns 18-19, Lines 67 and 1, delete "communciation" and insert -- communication --, therefor.

Column 21, Lines 30-46, delete "At step 450, client device 302 received the media content and the information. The client device 302 may provide a graphical interface like client device 304 to present Signed and Sealed this
Third Day of March, 2020

Andrei Iancu
*Director of the United States Patent and Trademark Office* the media content and the information. Client device 302 may be configured to communicate with the security process similar to the application on a trusted device. The graphical interface at client device 302 may be presented to prompt a user to provide a response to information and the media content presented on client device 304. For example, the graphical interface may request input responsive to the media content and the information related to the media content. In some embodiments, the graphical interface at client device 302 may provide the media content. The media content may not be provided so that a user must rely on the trusted device to view the media content to respond to the information (e.g., questions) presented with the media content." and insert the same on Column 21 Line 29, as a continuation of the same paragraph.

Column 22, Lines 45-55, delete "GUI 500 may be presented the first time a user operates the client device to obtain access to resources by authentication via access management system 140. GUI 500 may be presented when a user requests access to a resource. GUI 500 may be presented as part of an application (e.g., "OOW Access Portal"), such as an access portal application or website, supporting access management system 140. GUI 500 may be presented as part of one or more authentication processes for registering the client device for a user. Any type of authentication process may be implemented in GUI 500." and insert the same on Column 22 Line 46, as another paragraph.

In the Claims

In Column 38, Line 37, in Claim 11, before "the one" delete "each of".